(12) United States Patent
Hirata et al.

(10) Patent No.: US 6,840,447 B2
(45) Date of Patent: Jan. 11, 2005

(54) IC CARD READER WITH CARD HOLDER FASTENING MECHANISM AND CARD HOLDER

(75) Inventors: Tatsuya Hirata, Anjo (JP); Masahiro Takiguchi, Anjo (JP); Kiyoshi Takahashi, Hekinan (JP); Masahiro Sugiura, Takahama (JP); Akihiro Sugiura, Kariya (JP); Toshio Isobe, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 34 days.

(21) Appl. No.: 10/184,046

(22) Filed: Jun. 28, 2002

(65) Prior Publication Data

US 2003/0010828 A1 Jan. 16, 2003

(30) Foreign Application Priority Data

Jun. 29, 2001 (JP) ........................................ 2001-199386

(51) Int. Cl.[7] .............................................. G06K 7/08
(52) U.S. Cl. ........................................ 235/451; 439/160
(58) Field of Search ................................. 235/451, 487, 235/492, 486, 475; 439/76.1, 160, 260, 327, 152–153, 155

(56) References Cited

U.S. PATENT DOCUMENTS

| 5,679,007 | A | | 10/1997 | Potdevin et al. |
| 5,955,722 | A | * | 9/1999 | Kurz et al. .................. 235/479 |
| 6,024,286 | A | * | 2/2000 | Bradley et al. ............. 235/492 |
| 6,216,954 | B1 | * | 4/2001 | Kuwamoto et al. ......... 235/486 |
| 6,343,945 | B1 | * | 2/2002 | Liikanen ..................... 439/160 |

FOREIGN PATENT DOCUMENTS

JP         2001-291555      10/2001

* cited by examiner

*Primary Examiner*—Diane I. Lee
*Assistant Examiner*—Lisa M. Caputo
(74) *Attorney, Agent, or Firm*—Posz & Bethards, PLC

(57) ABSTRACT

An IC card reader is provided for reading data stored in an IC card with radio communication and inputting the data into, for example, a personal computer. The IC card reader includes a card holder and a fastening mechanism which attaches the card holder to a data reading table detachably. This structure provides for ease of usage of the card reader to a user in two selectable modes. In the first mode, the stored data may be inputted into the computer only by passing the IC card over the data reading table instantaneously. In the second mode, the user may insert the IC card into the card holder fitted on the data reading table to transmit data to the compute through radio communication.

20 Claims, 24 Drawing Sheets

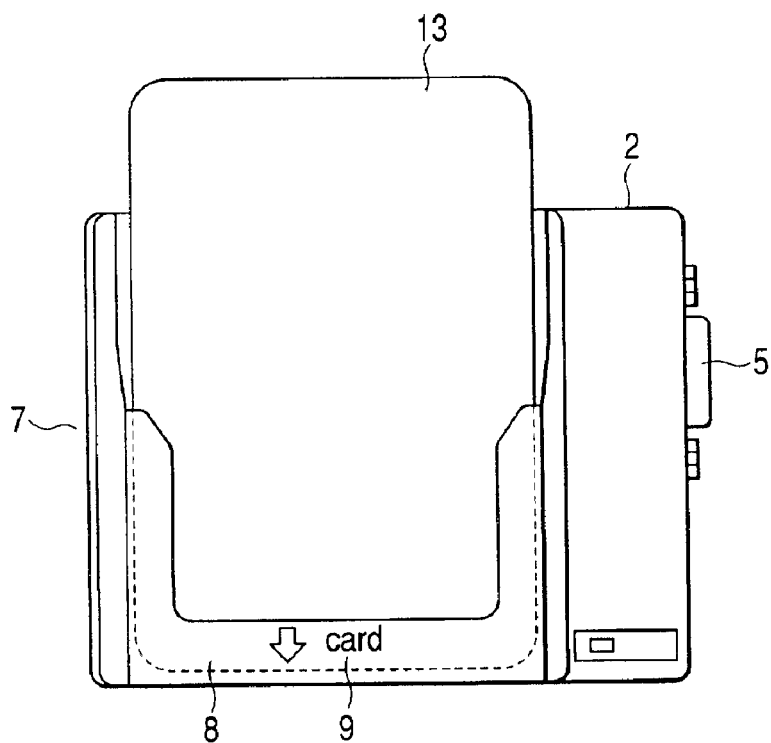
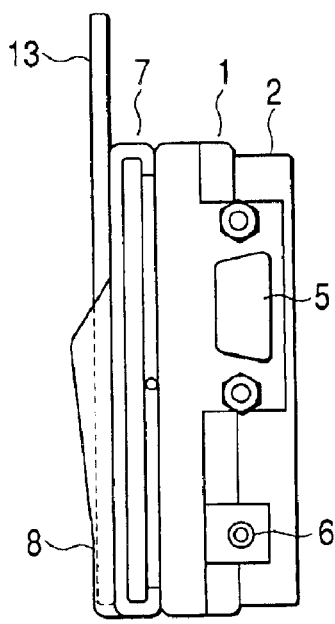
FIG. 5(a)
FIG. 5(b)

FIG. 7(a)
FIG. 7(c)
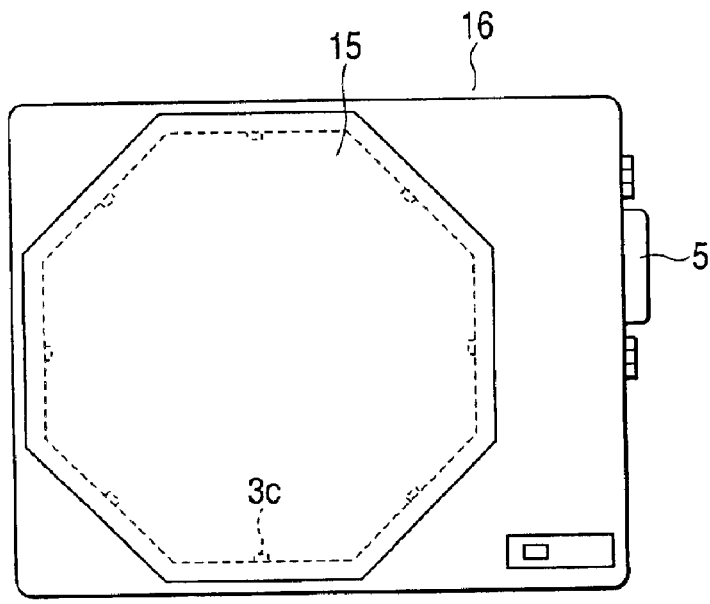
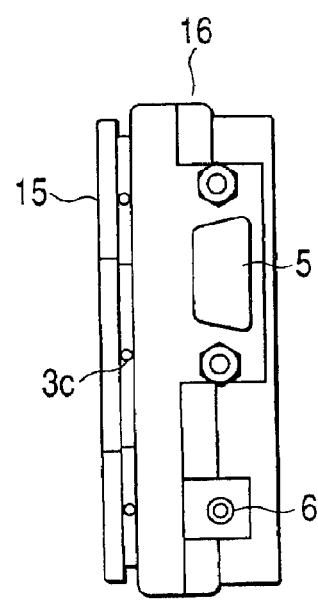
FIG. 7(b)
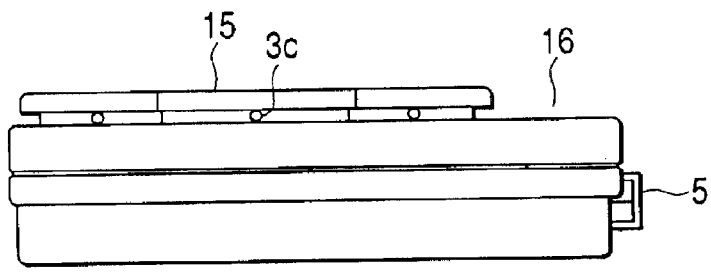

FIG. 11(a)
FIG. 11(c)
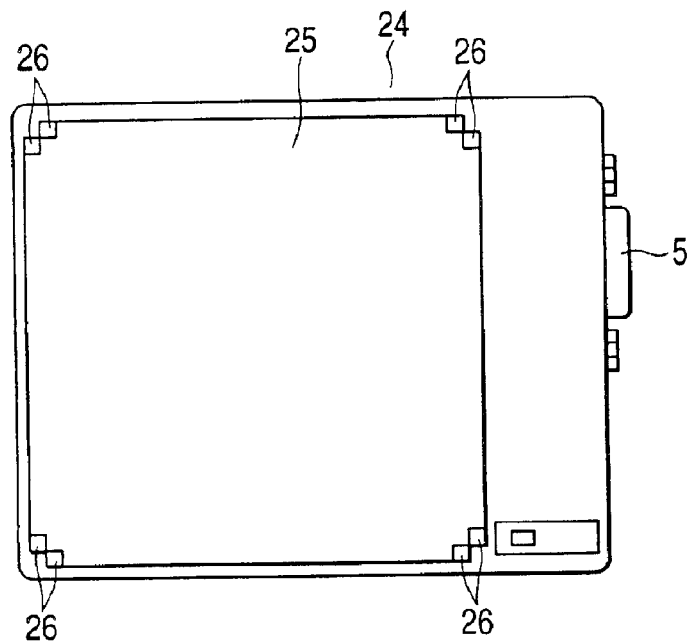
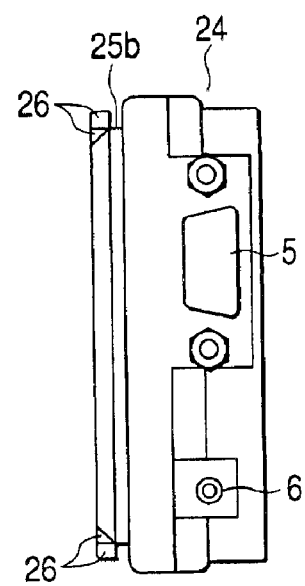
FIG. 11(b)
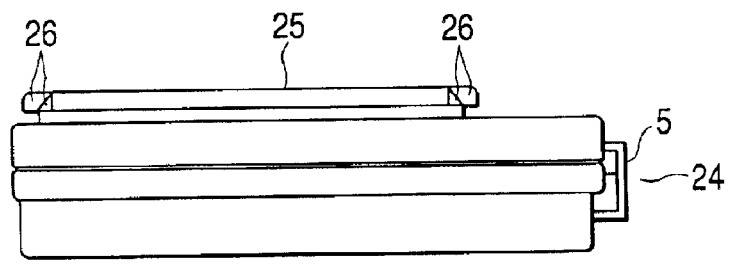

IC CARD READER WITH CARD HOLDER FASTENING MECHANISM AND CARD HOLDER

CROSS-REFERENCE TO RELATED APPLICATIONS

This application claims foreign priority to Japanese application 2001-199386, filed 29 Jun. 2001.

BACKGROUND OF THE INVENTION

1. Technical Field of the Invention

The present invention relates generally to an IC card reader designed to read data from an IC card, and more particularly to such an IC card reader with a fastening mechanism which attaches a card holder detachably to a data reading table and a card holder configured to establish detachable installation on an IC card reader.

2. Background Art

Contaceless IC cards are now being employed in various applications for establishing radio communication with an IC card reader. For instance, the IC card may be used to check whether a card user is an authorized person or not when entering a security room. The user passes the IC card nearby the IC card reader to input an ID code. The IC card may also be used in checking whether the card user is a person authorized to use a personal computer or not. In this case, the user passes, like the above, the IC card nearby the IC card reader to input an ID code into the computer when starting it.

Further, the IC card may be used for access to security files stored in a personal computer many times or inputting a user ID code into a merchant computer system for making an electronic payment for a purchase during the on-line internet shopping at various web sites. In such a case, the user must pass the IC card over the IC card reader each time the ID code is required to be inputted to the computer. This is quite inconvenient for the user. In order to alleviate such an inconvenience, a card holder may be employed to hold the IC card on a data reading table of the IC card reader. A drawback is, however, encountered in that different types of card holders and IC card readers need to be prepared for meeting various application requirements.

SUMMARY OF THE INVENTION

It is therefore a principal object of the invention to avoid the disadvantages of the prior art.

It is another object of the invention to provide an IC card reader and a card holder capable of meeting various application requirements.

According to one aspect of the invention, there is provided an IC card reader which is used in reading data stored in an IC card and inputting it into, for example, a personal computer through radio communication. The IC card reader generally comprises: (a) a casing; (b) an antenna disposed within the casing which works to establish radio communication with an IC card which is placed over a data reading table provided on the casing; (c) a card holder designed to hold the IC card at the data reading table; and (d) a fastening mechanism which attaches the card holder to the data reading table detachably. This structure provides for ease of usage of the IC card reader to a user in two selectable modes. In the first mode, the user may input data into a host device such as a computer only by passing the IC card over the data reading table of the IC card reader instantaneously. In the second mode, the user may insert the IC card into the card holder fitted on the data reading table of the IC card reader to transmit data to the host device through the antenna.

In the preferred mode of the invention, the fastening mechanism is so designed as to allow the card holder to be installed on the data reading table selectively at different orientations.

The fastening mechanism may include a polygonal table used as the data reading table. The polygonal table is configured to have corners or sides establishing firm engagement with the card holder.

The polygonal table may be designed to establish the firm engagement at at least two of the corners or the sides with the card holder. The polygonal table is, for example, of square shape.

The fastening mechanism may be so configured that the card holder is fitted on the data reading table from a preselected direction. The card holder may include a card holding portion into or from which the IC card is to be inserted or drawn. The direction in which the IC card is drawn from the card holding portion is set different from the direction in which the card holder is fitted on the data reading table.

The direction in which the IC card is drawn from the card holding portion is preferably perpendicular to the direction in which the card holder is fitted on the data reading table.

The card holder may be so configured that the IC card is inserted and held. The card holder may have provided thereon an indication of a direction in which the IC card is to be inserted into the card holder.

The fastening mechanism may include a portion of the card holder which is configured to establish firm engagement of the card holder with the data reading table.

The casing has a plurality of surfaces oriented in different directions. One of the surfaces has installed thereon a communication port to which a communication cable is connected to establish communication with a host device and a power supply port to which a power supply cable is connected.

The communication port and the power supply port may be made of a single unit.

A support member may further be provided which is designed to support a body of the IC card reader in a given position on a plane.

The card holder defines an insertion path along which the IC card is inserted into the card holder. The support member holds the body of the IC card reader so as to orient the insertion path of the card holder to a given direction at a predetermined angle to the plane.

The support member may be formed integrally with the card holder.

The support member may be configured to have at least two mount tables on which the body of the IC card reader is to be mounted selectively. The mount tables are inclined at different angles to the plane, respectively. For example, a first one of the mount tables is inclined at a first angle less than 45° to the plane, while a second one of the mount tables is inclined at a second angle more than 45°.

The support member may be made of a one-piece resinous member.

The support member has a fastening mechanism working to establish firm installation of the body of the IC card reader thereon.

According to the second aspect of the invention, there is provided an IC card reader unit which comprises: (a) a casing; (b) an antenna disposed within the casing, the antenna working to establish radio communication with an IC card through radio communication which is placed over a data reading table provided on the casing; and (c) a fastening mechanism configured to attach to the data reading table detachably a card holder in which the IC card is to be held over the data reading table.

In the preferred mode of the invention, the fastening mechanism is so designed as to allow the card holder to be installed on the data reading table selectively at different orientations.

The fastening mechanism may include a polygonal table used as the data reading table. The polygonal table is configured to have corners or sides establishing firm engagement with the card holder.

According to the third aspect of the invention, there is provided a card holder for an IC card reader which comprises: (a) a card holding portion within which an IC card is to be held to establish radio communication with a data reading table of the IC card reader; and (b) a fastening mechanism working to establish installation of the card holing portion on the data reading table detachably.

In the preferred mode of the invention, the fastening mechanism is configured to establish firm engagement of the card holding portion on the data reading table at a given orientation.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5(a) is a plan view which shows an IC card reader/writer into which an IC card is inserted;

FIG. 5(b) is a side view of FIG. 5(a);

FIG. 7(a) is a plan view which shows an IC card reader/writer according to the second embodiment of the invention;

FIG. 7(b) is a front view of FIG. 7(a);

FIG. 7(c) is a side view of FIG. 7(a);

FIG. 11(a) is a plan view which shows a holder installation structure of an IC card reader/writer according to the fifth embodiment of the invention;

FIG. 11(b) is a front view of FIG. 11(a);

FIG. 11(c) is a side view of FIG. 11(a);

DESCRIPTION OF THE PREFERRED EMBODIMENTS

Figure 1A:
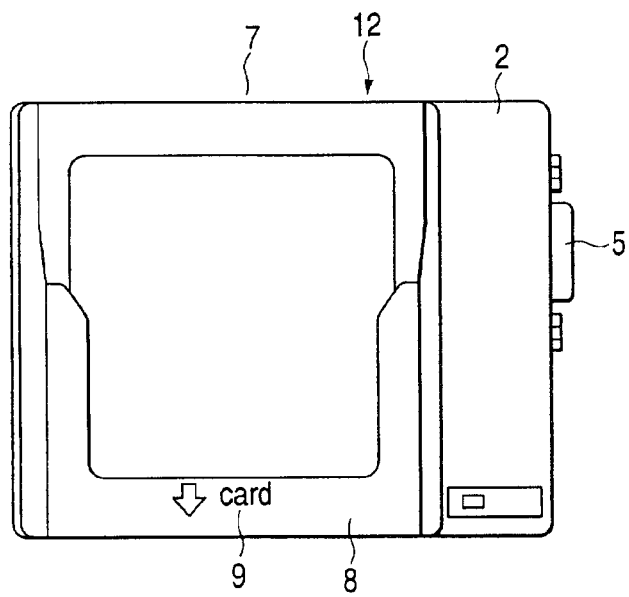
FIG. 1(a) is a plan view which shows an IC card reader/writer according to the first embodiment of the invention.

Referring to the drawings, wherein like reference numbers refer to like parts in several views, particularly to FIGS. 1(a) to 6(b), there is shown an IC card reader/writer 1 according to the invention.

The IC card reader/writer 12 consists essentially of a reader/writer unit 1 and a card holder 7.

Figure 2A:
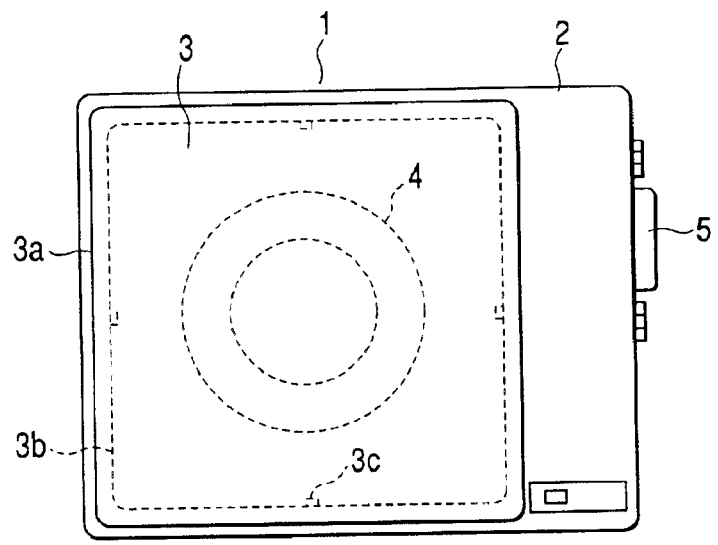
FIG. 2(a) is a plan view which shows an IC card reader/writer according to the first embodiment of the invention from which a card holder is removed.
Figure 2C:
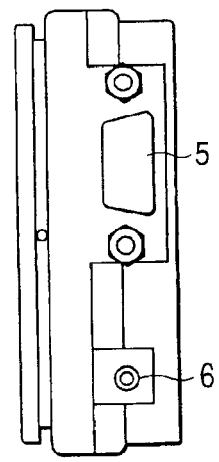
FIG. 2(c) is a side view of FIG. 2(a)
Figure 2B:
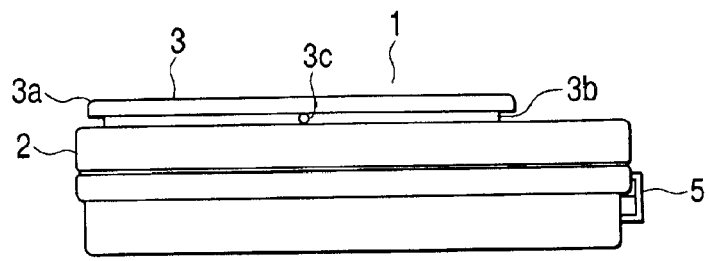
FIG. 2(b) is a front view of FIG. 2(a)
Figure 2D:
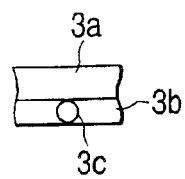
FIG. 2(d) is a partially enlarged view which shows a holder engagement structure provided on a data reading table.

The reader/writer unit 1 includes a rectangular casing 2 which has a major surface on which a data reading table 3, as clearly shown in FIGS. 2(a) and 2(b), is provided. The data reading table 3 has a square external form and projects as a whole from the casing 2. The data reading table 3 has a joint 3b to the major surface of the casing 2 and peripheral edges 3a extending outside the joint 3b to form guide rails for insertion of the card holder 7, as discussed below in detail. The data reading table 3 has disposed therein an antenna coil 4, as indicated by a broken line in FIG. 2(a), which works to establish radio communication with an IC card placed on or above the data reading table 3.

The reader/writer unit 1 also has, as clearly shown in FIG. 2(c), disposed in a side wall of the casing 2, a communication connector 5 such as an RS-232C interface with Dsub-9 pins and a DC-IN jack 6 into which a plug of an AC adapter (not shown) is to be inserted for supplying DC power used to operate the reader/writer unit 1. Into the connector 5, a cable is to be inserted for serial communication with a host device such as a personal computer.

Figure 3A:
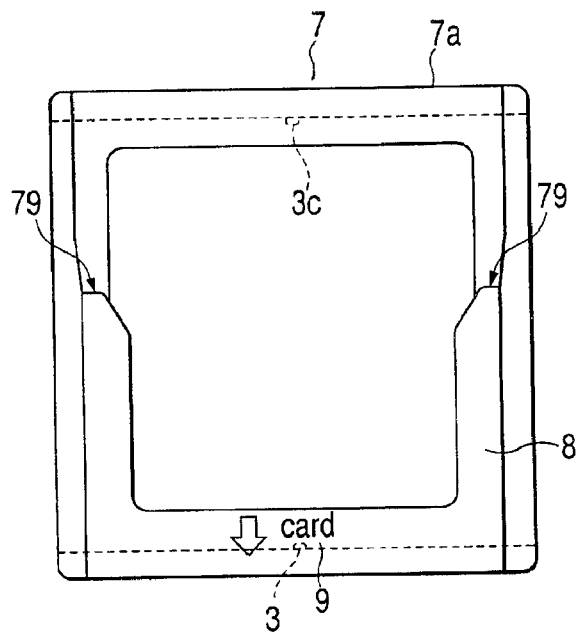
FIG. 3(a) is a plan view which shows a card holder.
Figure 3C:
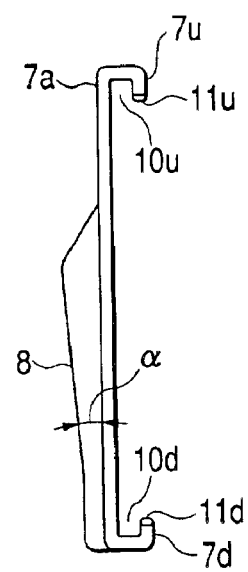
FIG. 3(c) is a side view of FIG. 3(a)
Figure 3B:
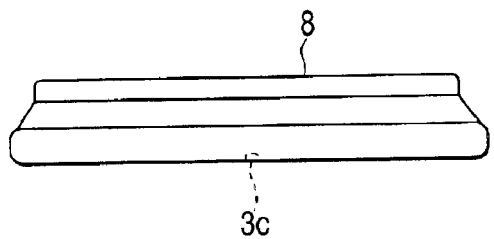
FIG. 3(b) is a front view of FIG. 3(a)

The card holder 7, as shown in FIGS. 1(a) to 1(c) and 3(a) to 3(c), is made of substantially square frame 7a and has a U-shaped card holding frame 8 formed over a lower half of the frame 7a which forms parallel guide grooves 79 (i.e., a card insertion guide path) into which sides of the IC card are inserted. The card holding frame 8, as can be seen from FIG. 3(c), is inclined to a user side at a given angle α to a plane of the frame 7a for providing ease of insertion of the IC card to the user.

An arrow and a character "Card" 9 are printed on or cut in a lower side of the card holding frame 8. The arrow indicates a direction in which the IC card is to be inserted into the card holder 7. The upper and lower sides 7u and 7d of the frame 7a are, as clearly shown in FIG. 3(c), curled to the rear side of the card holder 7 to form guide grooves 10u and 10d, respectively.

Figure 4A:
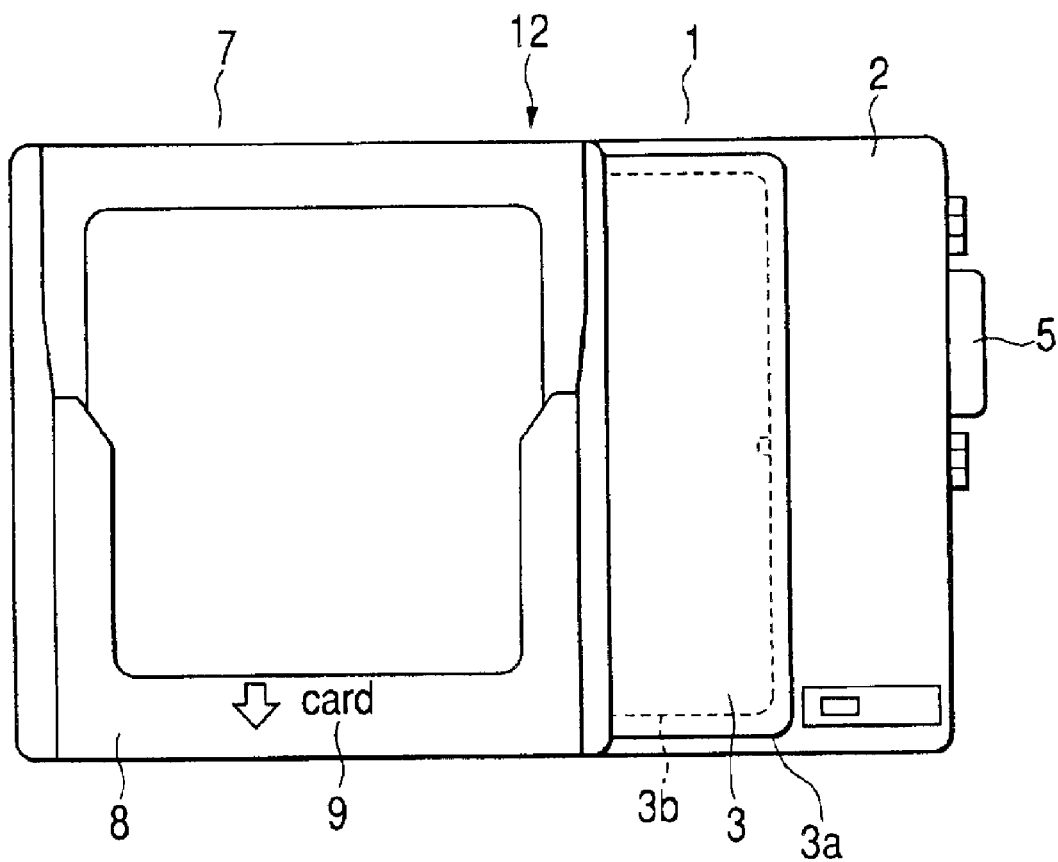
FIG. 4(a) is a plan view which shows a card holder being installed on a body of an IC card reader/writer.
Figure 4B:
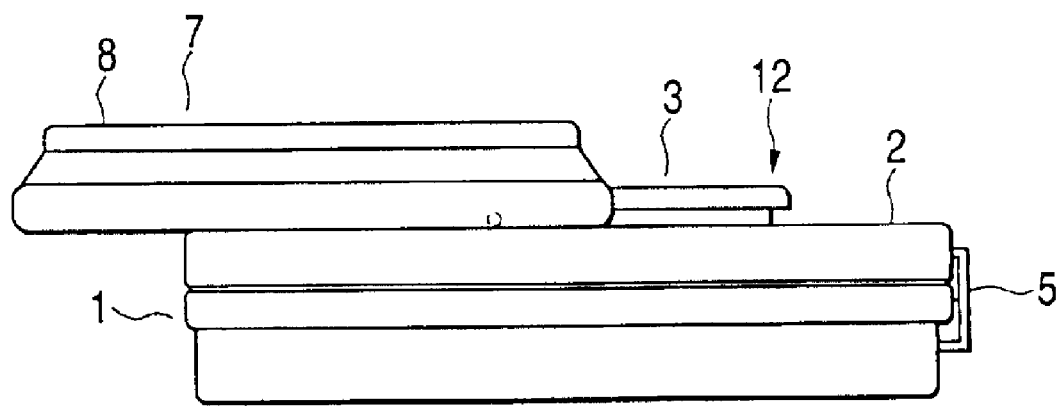
FIG. 4(b) is a front view of FIG. 4(a)

The card holder 7 is, as clearly shown in FIGS. 4(a) and 4(b), fitted on the data reading table 3 of the reader/writer unit 1 from a left side, as viewed in the drawings. Specifically, the installation of the card holder 7 on the data reading table 3 is accomplished by aligning the guide grooves 10u and 10d of the frame 7a with the guide rails formed by the peripheral edges 3a of the data reading table 3 and sliding the frame 7a to the right side, as viewed in the drawings.

Figure 3D:
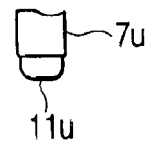
FIG. 3(d) is a partially enlarged view which shows a holder engagement structure mating with the one shown in FIG. 2(d)

The upper and lower sides 7u and 7d of the frame 7 of the card holder 7, as clearly shown in FIGS. 3(c) and 3(d), have formed on central portions of ends thereof protrusions 11u and 11d for establishing firm engagement with two of four recesses 3c, as shown in FIGS. 2(a) and 2(b), formed in central portions of side walls of the joint 3b of the data reading table 3. In the case, as illustrated in FIGS. 4(a) and 4(b), where the card holder 7 is fitted on the data reading table 3 from the left side, the protrusions 11u and 11d engage the upper and lower recesses 3c of the data reading table 3.

Figure 1C:
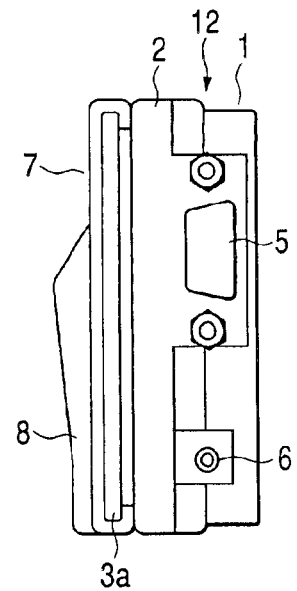
FIG. 1(c) is a side view of FIG. 1(a)
Figure 1B:
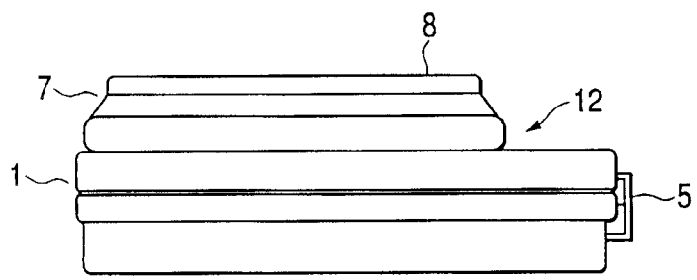
FIG. 1(b) is a front view of FIG. 1(a)

In the case where the card holder 7 is installed on the reader/writer unit 1 in a position as illustrated in FIGS. 1(a) to 1(c), the user is allowed to insert the IC card 13, as shown in FIGS. 5(a) and 5(b), into the card holding frame 8 from above it. The direction in which the card holder 7 is fitted on the reader/writer unit 1 is perpendicular to that in which the IC card 13 is inserted into or drawn from the card holder 7. After completion of insertion of the IC card 13 into the card holder 7, the IC card 13 is held vertically, as viewed in FIGS. 5(a) and 5(b).

The card holder 7 may alternatively be fitted on the reader/writer unit 1 from an angular direction oriented at 90°, 180°, or 270° to the direction, as illustrated in FIGS. 4(a) and 4(b).

Figure 6A:
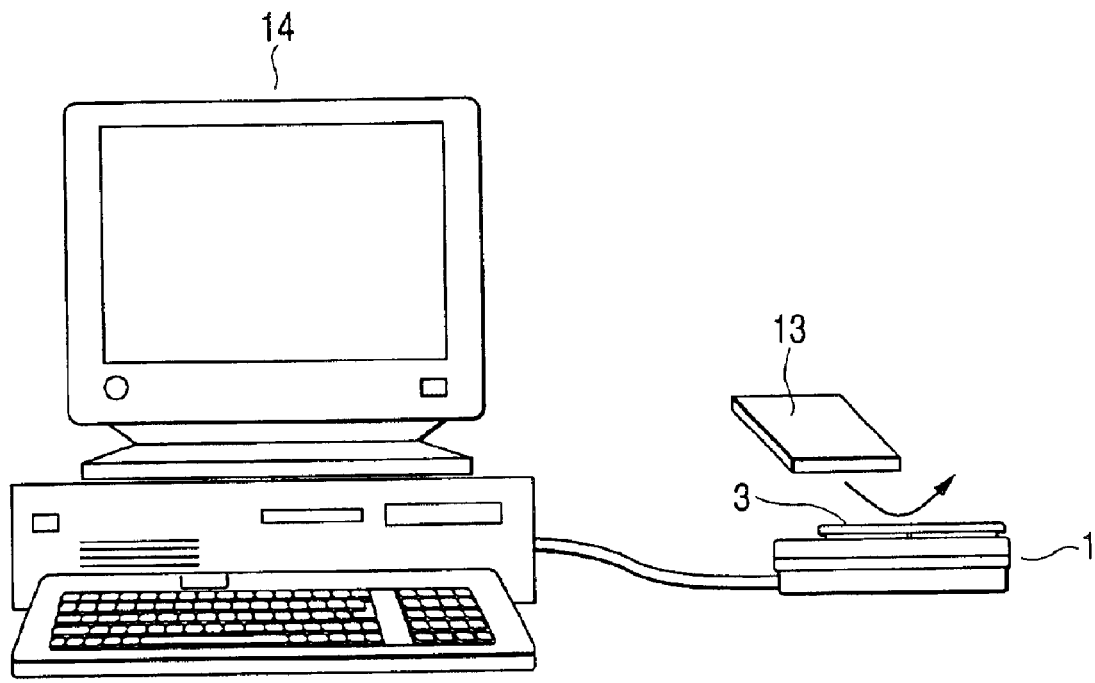
FIG. 6(a) is an illustration which shows an example wherein a user passes an IC car reader nearby an IC card reader/writer to input data into the reader/writer.
Figure 6B:
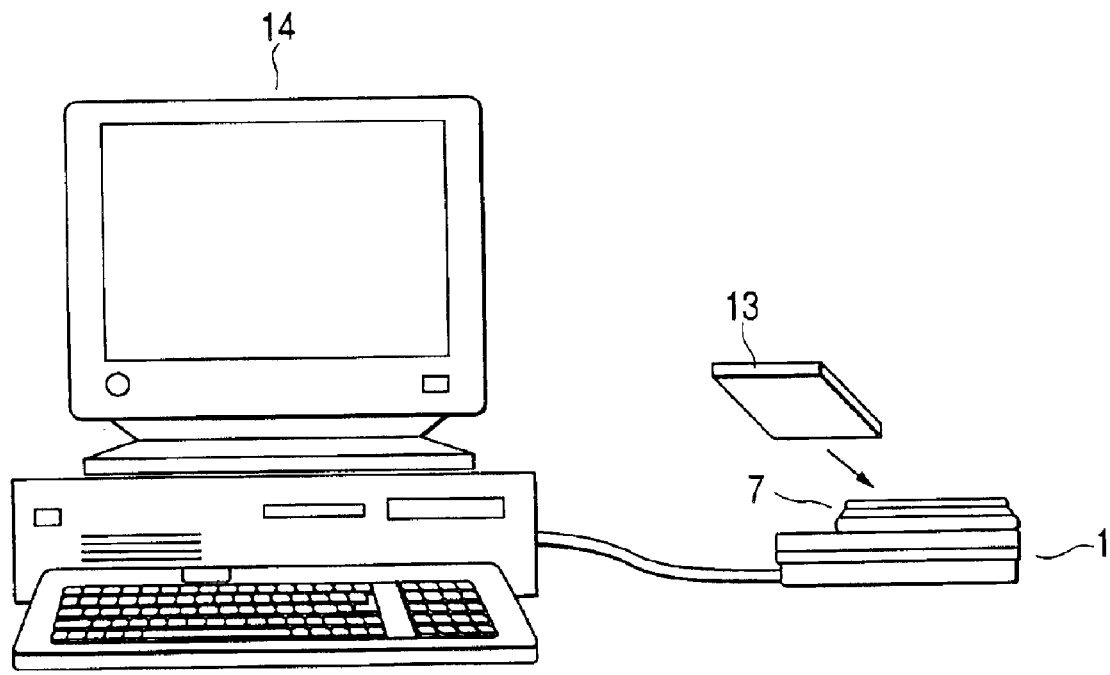
FIG. 6(b) is an illustration which shows an example wherein a user inserts an IC card into a card holder installed on an IC card reader/writer.

FIGS. 6(a) and 6(b) show examples of cases of use of the IC card reader/writer 12.

FIG. 6(a) illustrates for the case where a user inputs an ID password to a personal computer 14 which is required to start the personal computer 14. The card holder 7 is not installed on the reader/writer unit 1. The input of the password may be achieved by holding the IC card 13 in user's hand and passing it over the data reading table 3.

FIG. 6(b) illustrates for the case where the user purchases some products at a plurality of web sites through the internet. The card holder 7 is installed on the reader/writer unit 1. The user inserts the IC card 13 into the card holder 7. Each time it is required by a merchant computer system to identify a user ID code for making an electronic payment for the purchase during the on-line internet shopping, the IC car reader/writer 12 establishes communication with the merchant computer system through the computer 14 to transmit data stored in the IC card 13.

As apparent from the above discussion, the IC card reader/writer 12 is so designed as to provide for ease of installation and removal of the card holder 7 on and from the data reading table 3 of the reader/writer unit 1. Therefore, in a case where it is required only to establish a one-time instant communication between the IC card reader/writer 12 and the computer 14, the user is allowed to input the data in the IC card 13 into the IC card reader/writer 12 without having to install the card holder 7 on the reader/writer unit 1. Alternatively, in a case where it is required to establish several communications between the IC card reader/writer 12 and the computer 14 for a relatively long period of time, the user may install the card holder 8 on the date reading table 3 of the reader/writer 1 and insert the IC card 13 into the card holder 7. Specifically, the structure of the IC card reader/writer 12 of this embodiment meets different cases of use, as described above, thus eliminating the need for manufacturers to produce different types of IC card reader/writers meeting the various cases of use.

The data reading table 3 is of square shape in external form and designed to allow the user to insert the IC card 13 into the card holder 7 from different directions. Thus, the user may select a desired one of the directions in which the IC card 13 is to be inserted into or drawn from the car holder 7 without having to move the reader/writer unit 1. The protrusions 11u and 11d on the card holder 7 and the recesses 3c in the data reading table 3 serve to achieve a firm joint of the card holder 7 and the reader/writer unit 1.

The direction in which the card holder 7 is fitted on the reader/writer unit 1 is, as described above, perpendicular to that in which the IC card 13 is inserted into or drawn from the card holder 7, thereby avoiding accidental dislodgement of the card holder 7 from the reader/writer unit 1 caused by the insertion or drawing of the IC card 13.

The connector 5 and the DC-IN jack 6 are provided on the same side of the casing 2 of the IC card reader/writer 12, thus providing for ease of arrangement of cables, especially when the reader/writer 1 and the personal computer 14 are both disposed in a limited area.

Figure 8:
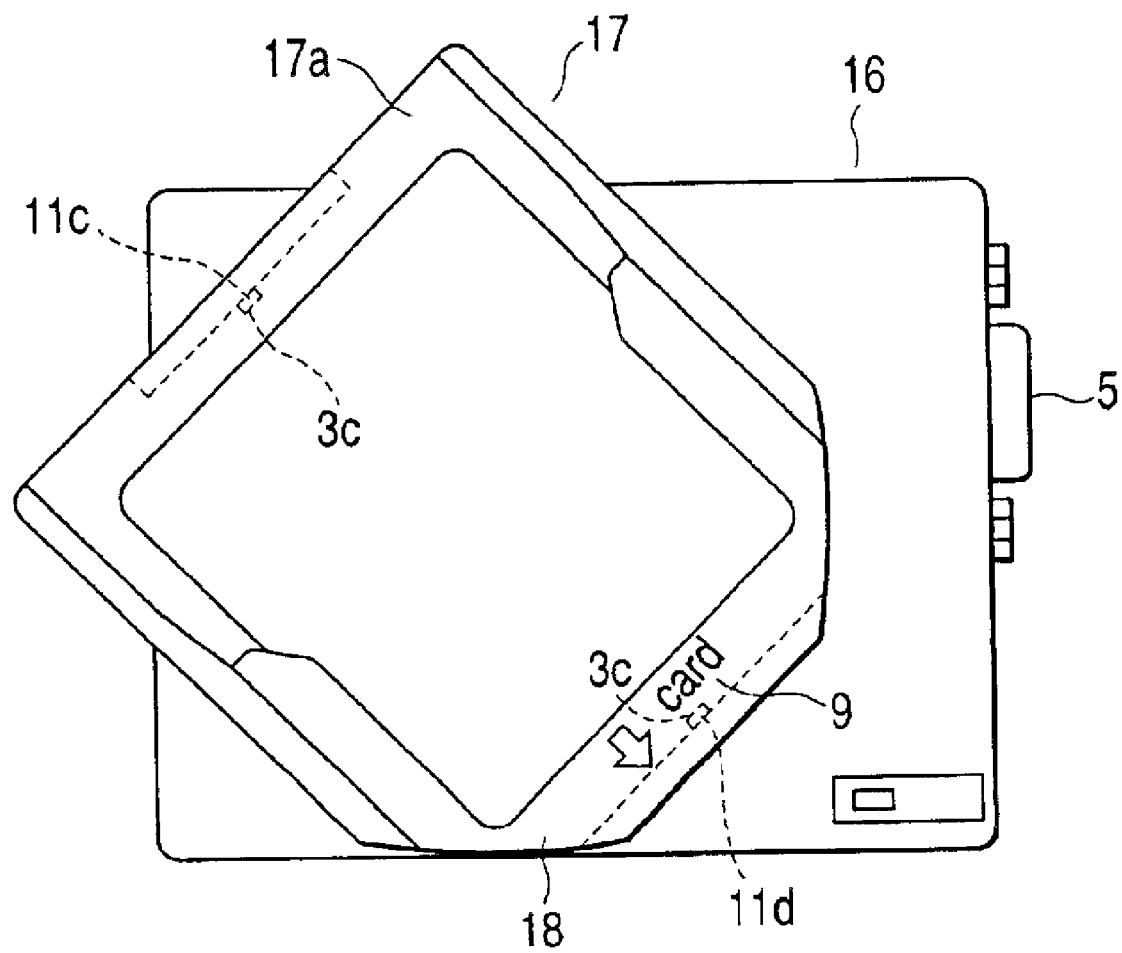
FIG. 8 is a plan view which shows the IC card reader/writer of FIG. 7(a) on which a card holder is installed.

FIGS. 7(a) to 8 show an IC card reader/writer according to the second embodiment of the invention which is different from the first embodiment in structures of the data reading table and the card holder. Other arrangements are identical, and explanation thereof in detail will be omitted here.

The IC card reader/writer includes a reader/writer unit 16 and a card holder 17. The reader/writer unit 16 has a data reading table 15 which is of regular octagonal shape in external form. The card holder 17 has a frame 17a and a holding frame 18 whose adjacent corners are cut at an angel of 45° to the side of the frame 17a. The recess 3c is formed in each side of the data reading table 15.

In a case, as illustrated in FIG. 8, the installation of the card holder 17 on the data reading table 15 is accomplished by sliding the card holder 17 downward, as viewed in the drawing, from a direction oriented at 45° upward and to the left. The user may select a desired one of eight directions in which the card holder 17 (i.e., an IC card) is to be inserted into or drawn from the reader/writer 16 in units of 45°.

Figure 9A:
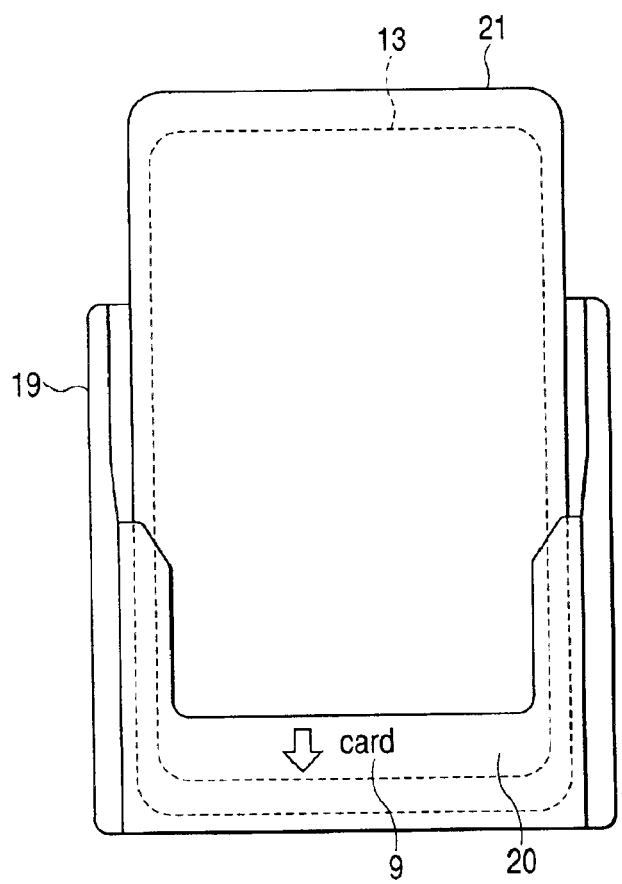
FIG. 9(a) is a plan view which shows a card holder according to the third embodiment of the invention.
Figure 9C:
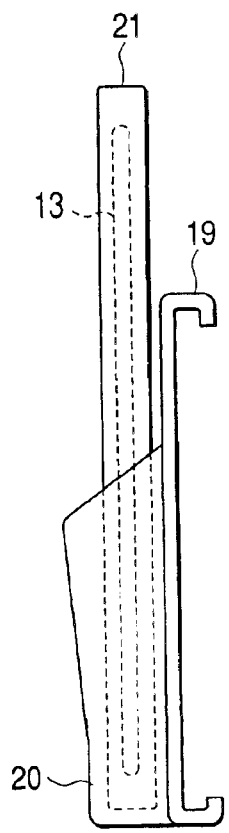
FIG. 9(c) is a side view of FIG. 9(a)
Figure 9B:
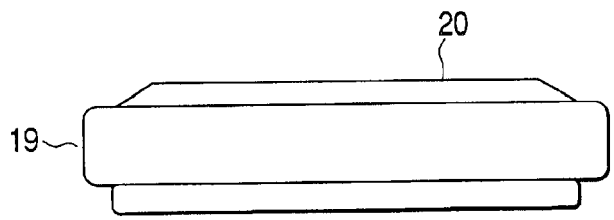
FIG. 9(b) is a front view of FIG. 9(a)
Figure 10A:
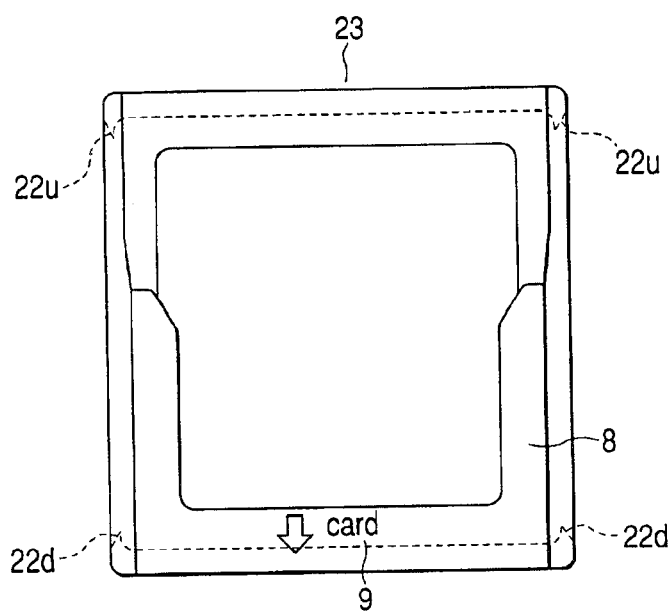
FIG. 10(a) is a plan view which shows a card holder according to the fourth embodiment of the invention.
Figure 10C:
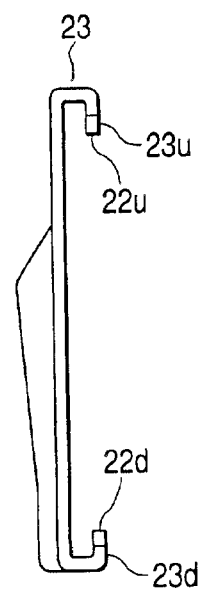
FIG. 10(c) is a side view of FIG. 10(a)
Figure 10B:
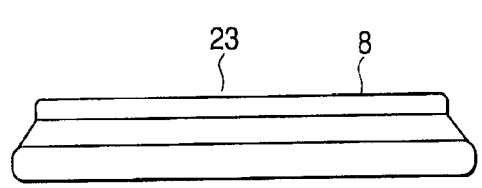
FIG. 10(b) is a front view of FIG. 10(a)
Figure 10D:
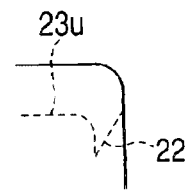
FIG. 10(d) is a partially enlarged view which shows a holder engagement structure for installing a card holder firmly on a body of an IC card reader/writer.
Figure 12A:
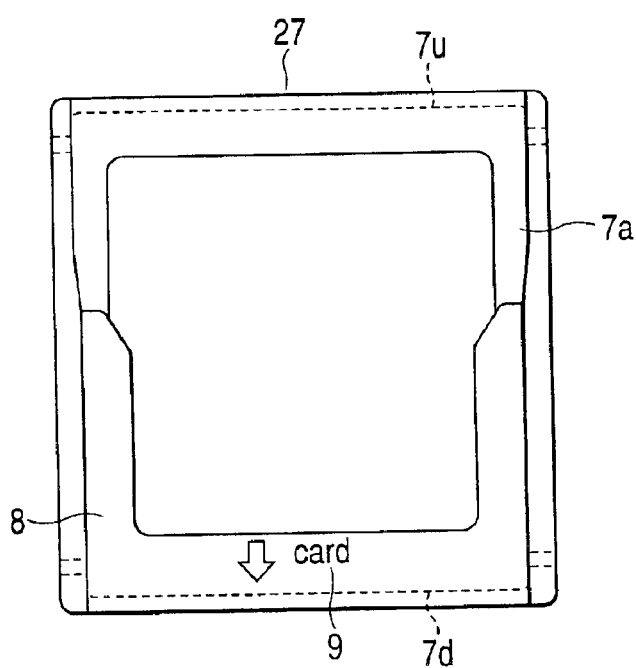
FIG. 12(a) is a plan view which shows a card holder which is to be installed on the IC card reader/writer in FIGS. 11(a) to 11(c)
Figure 12C:
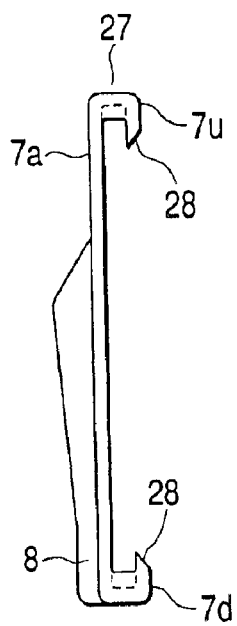
FIG. 12(c) is a side view of FIG. 12(a)
Figure 12B:
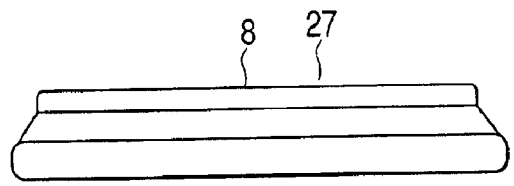
FIG. 12(b) is a front view of FIG. 12(a)
Figure 12D:
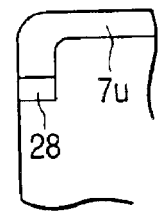
FIG. 12(d) is a partially enlarged view which shows a holder engagement structure for establishing firm engagement of a card holder with a body of the IC card reader/writer in FIGS. 11(a) to 11(c)

FIGS. 9(a) to 9(c) show a card holder 19 according to the third embodiment of the invention.

The card holder 19 has a width slightly greater than that of the card holder 7 in the first embodiment. Similarly, a card holding frame 20 has a width slightly greater than that of the card holding frame 8 in the first embodiment. The card holder 19 has the same joint mechanism as that of the card holder 7 in the first embodiment and can be installed directly on the reader/writer unit 1. The structure of this embodiment is useful for a case where the IC card 13 is packed in, for example, a polyvinyl casing 21. Specifically, it is possible to insert the IC card 13 packed in the casing 21 into the card holder 19 as it is.

Other arrangements are identical with those in the first embodiment, and explanation thereof in detail will be omitted here.

FIGS. 10(a) to 10(d) show a card holder 23 in the fourth embodiment of the invention.

The card holder 23 has sharp protrusions 22u and 22d formed on ends of upper and lower sides 23u and 23d of the frame 7a, as viewed in the drawings, instead of the protrusions 11u and 11d formed on the central portions of the upper and lower sides 7u and 7d of the frame 7a in the first embodiment.

The protrusions 22u and 22d are elastically deformable. When the card holder 23 slides on the data reading table 3, and each corner thereof reaches a corresponding one of the corners of the data reading table 3, the protrusions 22u and 22d are elastically fitted on the corners of the data reading table 3, thereby achieving a firm joint of the card holder 23 to the data reading table 3.

Other arrangements are identical with those in the first embodiment, and explanation thereof in detail will be omitted here.

FIGS. 11(a) to 12(d) show an IC card reader/writer according to the fifth embodiment of the invention.

The IC card reader/writer consists of a reader/writer unit 24 and a card holder 27. The card holder 27 has, as clearly shown in FIGS. 12(a) and 12(c), the frame 7a whose upper and lower sides 7u and 7d have, as clearly shown in FIG. 12(d), tapered ends 28, respectively. The tapered ends 28 are oriented at approximately 45° to the sides 7u and 7d.

The reader/writer unit 24 includes, as shown in FIGS. 11(a) and 11(b), a data reading table 25 which has a recess formed in each corner thereof. Each recess has two tapered surfaces 26 which are oriented perpendicular to each other.

The installation of the card holder 27 on the data reading table 25 is accomplished by placing the card holder 27 over the plane of the data reading table 25, coinciding the corners of the card holder 27 with those of the data reading table 25, and pushing the card holder 27 against the plane of the data reading table 25 to cause the tapered ends 28 to be deformed elastically, passed over the tapered surfaces 26, and fitted on the joint 25b.

Other arrangements are identical with those in the first embodiment, and explanation thereof in detail will be omitted here.

FIGS. 13(a) to 15(b) show an IC card reader/writer 32 according to the fifth embodiment of the invention.

The IC card reader/writer 32 includes a card holder 29 which is made up of a card holding portion 30 and a stay 31. The card holding portion 30 has substantially the same structure as that of the card holder 7 in the first embodiment. The stay 31 works as a support for holding the reader/writer unit 1 in a vertical position on a desk, for example. The card holding portion 30 may be formed integrally with the stay 31.

Figure 13A:
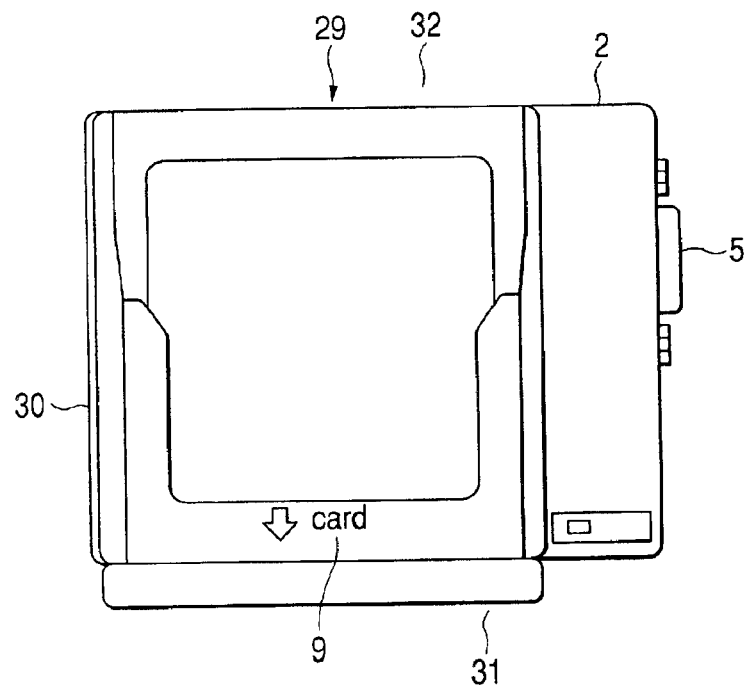
FIG. 13(a) is a plan view which shows an IC card reader/writer according to the sixth embodiment of the invention which includes a stay for supporting a body of the IC card reader/writer at a desired position on a plane.
Figure 13C:
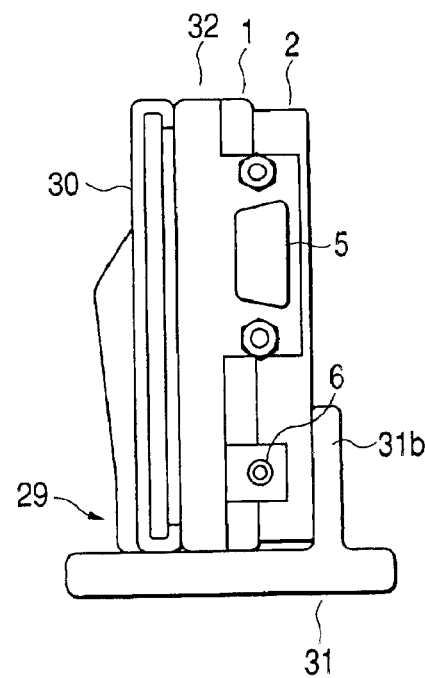
FIG. 13(c) is a side view of FIG. 13(a)
Figure 13B:
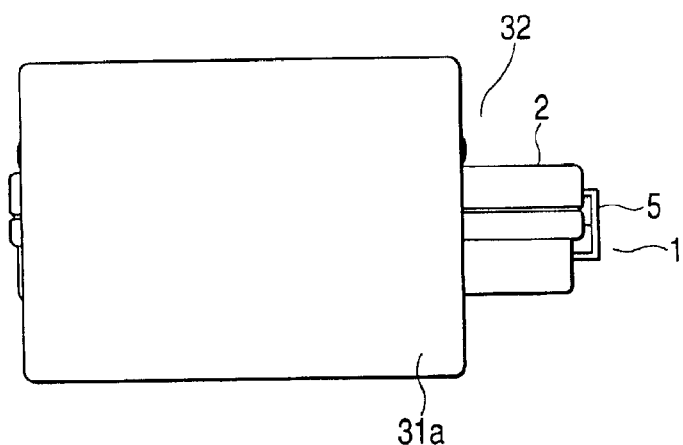
FIG. 13(b) is a front view of FIG. 13(a)

The stay 31 is made up of a rectangular base plate 31a, as shown in FIG. 13(b), and a support plate 31b, as shown in FIG. 13(c), extending perpendicular to a plane of the base plate 31a. The card holding portion 30 stands on the base plate 31a vertically at a given interval away from the support plate 31b which is equivalent to the thickness of the reader/writer unit 1. Fitting the card holder 29 on the reader/writer unit 1 in the same manner as described in the first embodiment, the reader/writer unit 1 is held vertically by the card holding portion 30 and the support plate 31b of the stay 31.

Other arrangements are identical with those in the first embodiment, and explanation thereof in detail will be omitted here.

Figure 14:
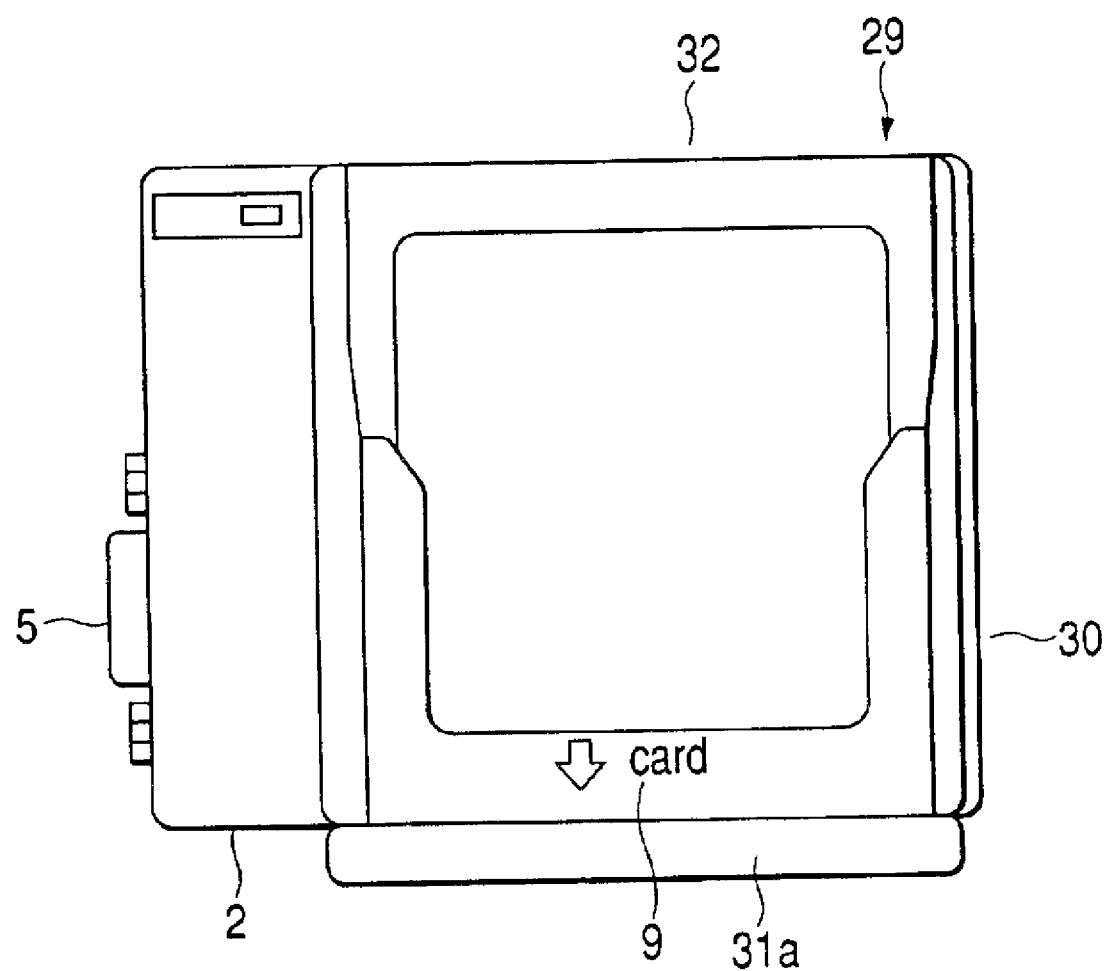
FIG. 14 is a plan view which shows the IC card reader/writer in FIGS. 13(a) to 13(c) on which the card holder is installed at orientation reversed to that in FIGS. 13(a) to 13(c)

FIG. 14 illustrates for a case where the card holder 29 is fitted on the reader/writer unit 1 from a direction diametrically opposed to that in FIGS. 13(a) to 13(c). Specifically, in the case of FIGS. 13(a) to 13(c), the connector 5 and the DC-IN jack 6 are located on the right side of the casing 2, as viewed in FIGS. 13(a) and 13(b), while in the case of FIG. 14, they are located on the left side.

Figure 15A:
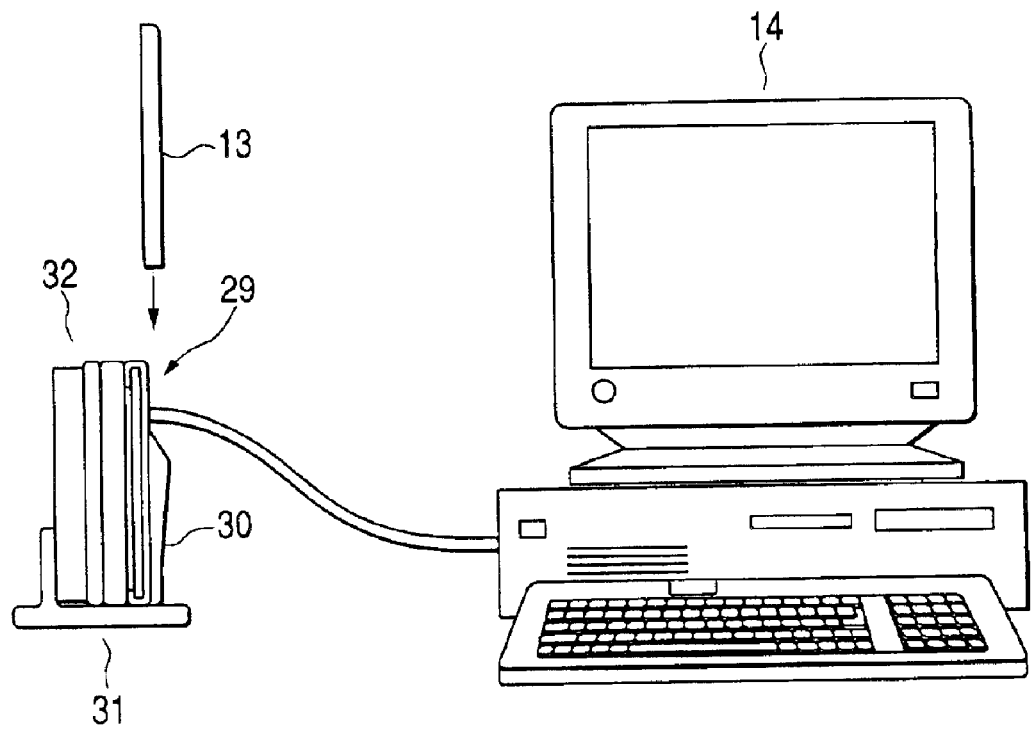
FIG. 15(a) is an illustration which shows a first example wherein the IC card reader/writer in FIGS. 13(a) to 13(c) is placed on a left side of a personal computer.
Figure 15B:
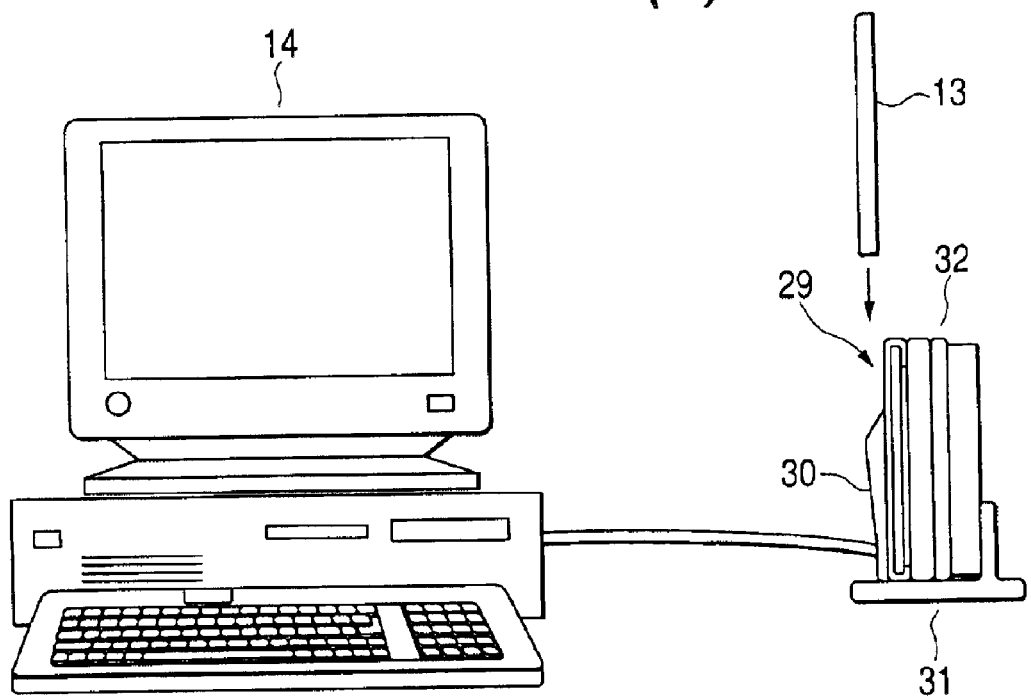
FIG. 15(b) is an illustration which shows a second example wherein the IC card reader/writer in FIGS. 13(a) to 13(c) is placed on a right side of a personal computer.

FIG. 15(a) illustrates for the case where the IC card reader/writer 32 on which the card holder 29 is fitted in the manner shown in FIGS. 13(a) to 13(c) is placed on the left side of the personal computer 14. FIG. 15(b) illustrates for the case where the IC card reader/writer 32 on which the card holder 29 is fitted in the manner shown in FIG. 14 is placed on the right side of the personal computer 14. In either case, the IC card 13 is inserted into the card holding portion 30 of the card holder 29 vertically from above the IC card reader/writer 32.

Figure 16A:
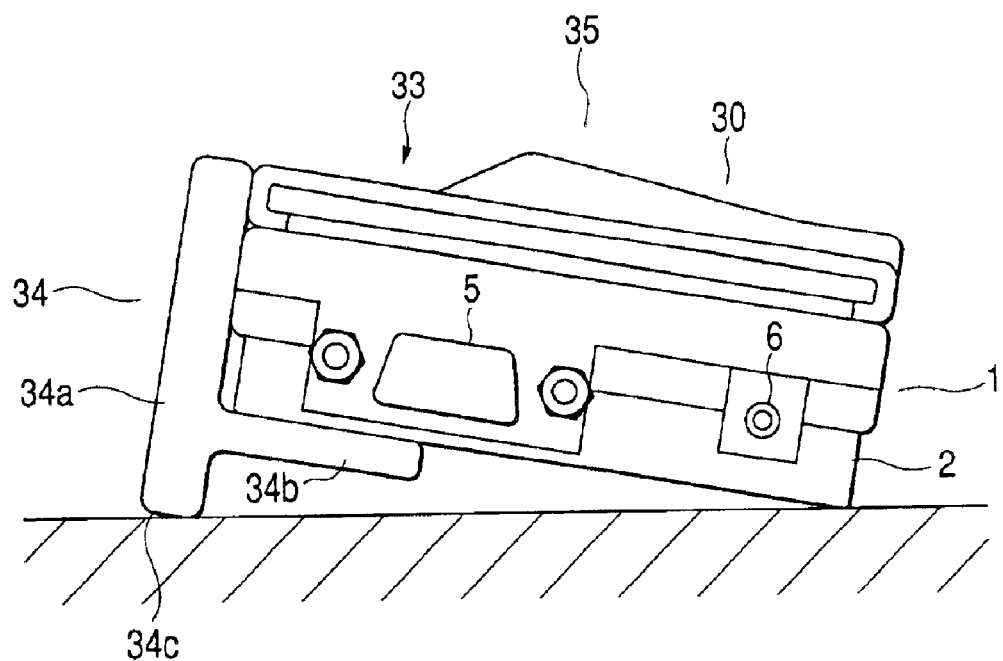
FIG. 16(a) is a side view which shows an IC card reader/writer according to the seventh embodiment of the invention which includes a stay for supporting a body of the IC card reader/writer at a desired position on a plane.
Figure 16B:
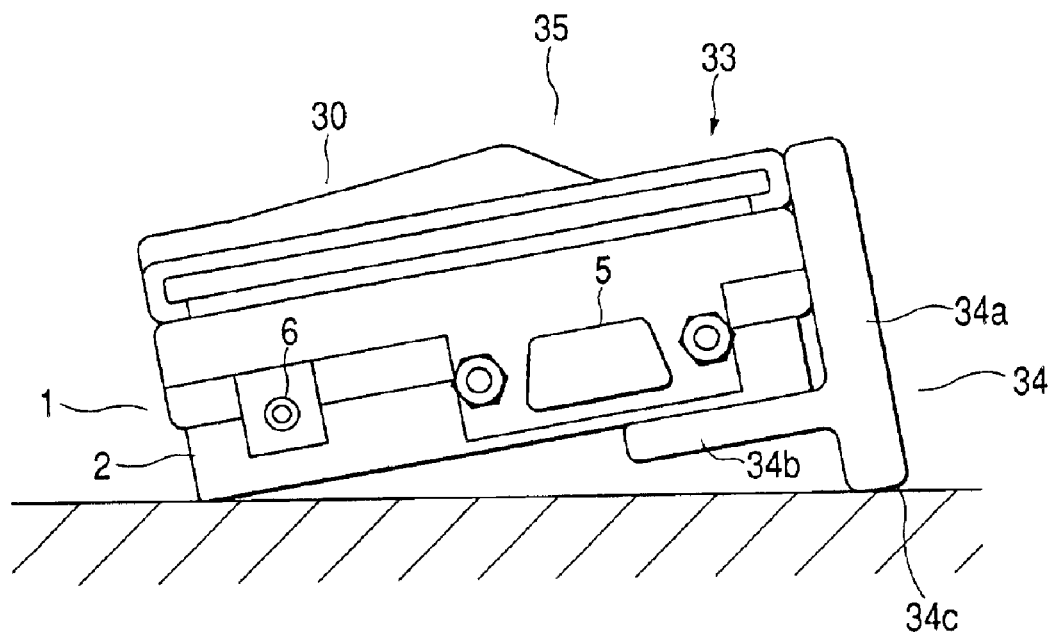
FIG. 16(b) is a side view which shows the stay of FIG. 16(a) installed on an opposite side of the body of the IC card reader/writer.
Figure 17:
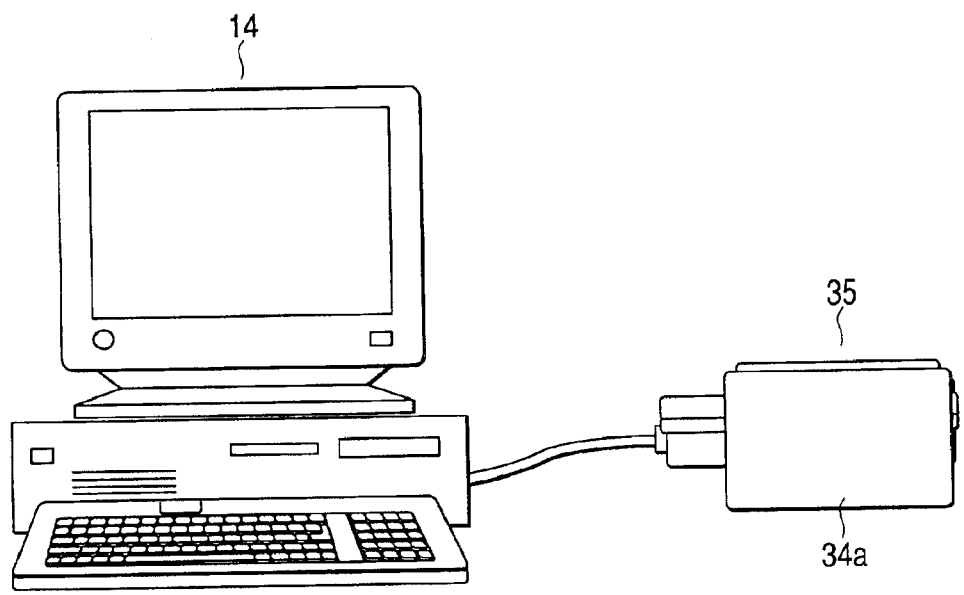
FIG. 17 is an illustration which shows the IC card reader/writer of FIG. 16(a) or 16(b) placed on a side of a personal computer.

FIGS. 16(a) to 17 show an IC card reader/writer 35 according to the seventh embodiment of the invention which is different from the sixth embodiment of FIGS. 13(a) to 15(b) only in structure of a card holder 33. Other arrangements are identical, and explanation thereof in detail will be omitted here.

The card holder 33 has a card holding portion 30 standing on a base plate 34a of a stay 34 at an orientation opposed to that in the sixth embodiment. The base plate 34a has a width smaller than that of the base plate 31a in the sixth embodiment, so that it does not, as can be seen from FIGS. 16(a) and 16(b), project from the card holding portion 30 in order to eliminate interference with manual insertion of the IC card by the user.

In use, the IC card reader/writer 35 is, as shown in FIGS. 16(a) and 16(b), laid on a desk in contact of a rear end 34c of the base plate 34a of the stay 34 and a corner of the casing 2 of the reader/writer unit 1 with the surface of the desk. This causes the IC card reader/writer 35 (i.e., the card holding portion 30) to be oriented to a user at an angle which provides for ease of insertion of the IC card, especially when the user is sitting on a chair. Additionally, the inclination of the card holding portion 30 to the plane of the desk also ensures close contact between the IC card and the data reading table 3, thus resulting in improved stability of communication between the IC card and the IC card reader/writer 35.

The IC card reader/writer 35 of FIG. 16(a) is reversed in orientation of the card holder 33 to the reader/writer unit 1.

FIG. 17 illustrates the case where the IC card reader/writer 35 on which the card holder 33 is fitted in the position, as shown in FIG. 16(b), is placed on the right side of the personal computer 14. The user is permitted to insert the IC card into the card holder 33 while facing the front of the personal computer 14.

FIGS. 18 to 20(b) show an IC card reader/writer 12 according to the eighth embodiment.

The IC card reader/writer 12 consists essentially of a reader/writer unit 1, a card holder 7, and a stay 36. The reader/writer unit 1 and the card holder 7 may have the same structures as those in the first to fifth embodiments of FIGS. 1 to 12(d). The stay 36 is made of up a rectangular base 36a and two mount tables 36b and 36c configured to provide different angles of the card insertion guide path to the user. The mount tables 36b and 36c extend vertically from opposed ends of the base 36a and are bent inwardly at angles θ1 and θ2. The angle θ1 is less than 45° while the angle θ2 is more than 45°. Ends of the mount tables 36b and 36c face each other through a small gap. The stay 36 is formed by a one-piece strip made of, for example, synthetic resin.

Figure 18:
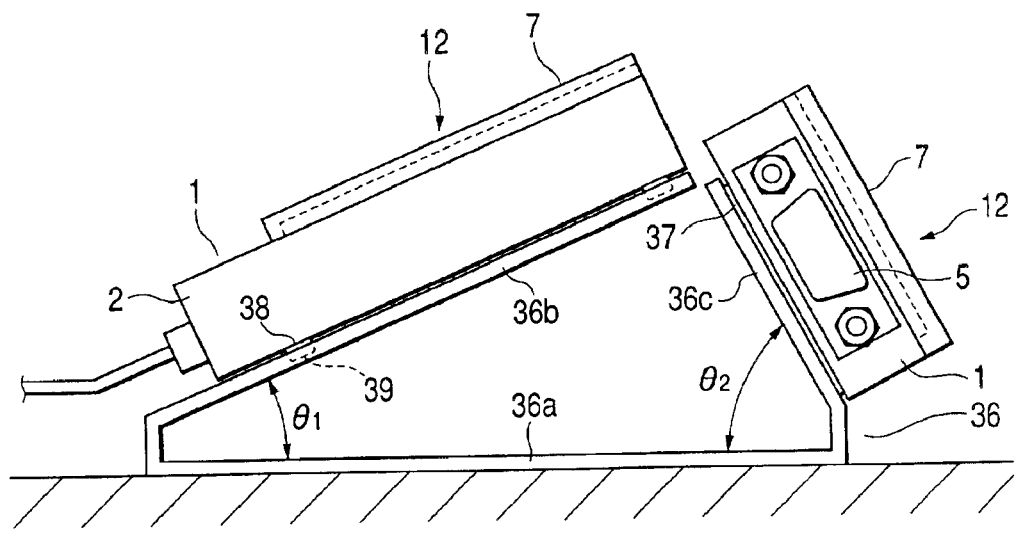
FIG. 18 is a side view which shows an IC card reader/writer according to the eighth embodiment of the invention which includes a stay configured to support a body of the IC card reader/writer in two different positions.

The reader/writer unit 1 may be mounted on either of the mount tables 36b and 36c. FIG. 18 exemplifies, for convenience of illustration, the stay 36 on which the two reader/writer units 1 are installed on the mount tables 36b and 36c, respectively.

The reader/writer unit 1 has legs 38 formed on the bottom of the casing 2. The legs 38 are fitted in mating holes or recesses 39 formed in the surface of each of the mount tables 36b and 36c, thereby holding the reader/writer unit 1 firmly on one of the mount tables 36b and 36c. The reader/writer unit 1 may alternatively be attached to either of the mount tables 36b and 36c using a pressure sensitive adhesive double coated tape. A stopper may be formed on a lower edge of each of the mount tables 36b and 36c for avoiding a downward slippage of the reader/writer unit 1.

Figure 19A:
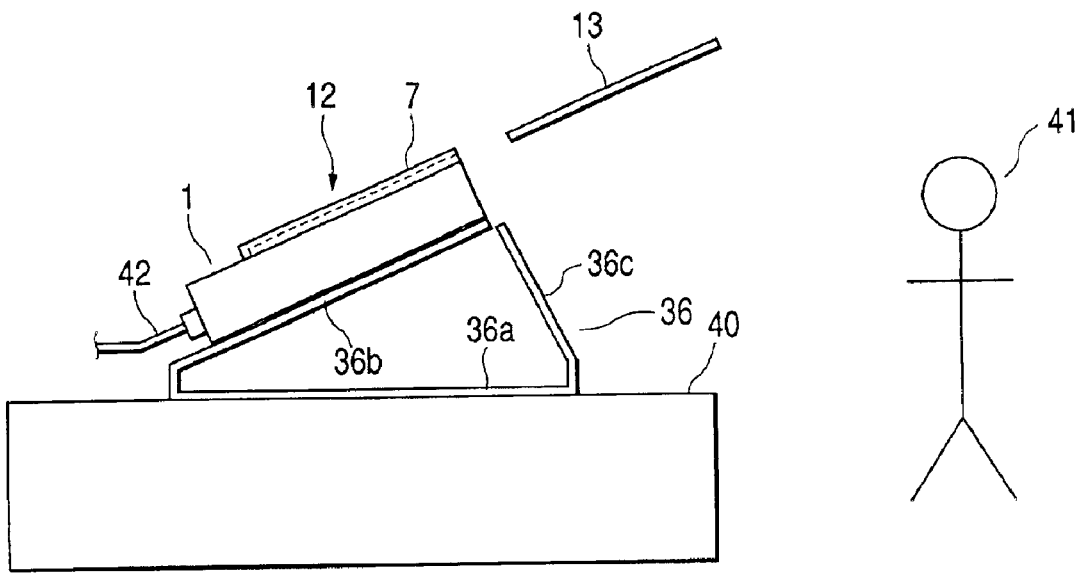
FIG. 19(a) is an illustration which shows the body of the IC card reader/writer of FIG. 18 which is placed on one of two mount tables at a first orientation.

FIG. 19(a) illustrates a first example where the stay 36 is placed on a desk 40, and the reader/writer unit 1 on which the card holder 7 is fitted is mounted on the mount table 36b of the stay 36. The user 41 is allowed to insert the IC card 13 into the card holder 7 from an upper and right direction, as viewed the drawing. The connector 5 and the DC-IN jack 6 (not shown in FIG. 19(a)) are located on the rear side of the reader/writer 1, as viewed from the user 41 (i.e., the left side of the drawing). This arrangement is useful for a case where it is possible to secure a space for a communication cable 42 on the rear side of the desk 40.

FIG. 19(a) illustrates a second example where the stay 36 is placed on the desk 40, and the reader/writer unit 1 on which the card holder 7 is fitted is mounted on the mount table 3b of the stay 36. The user 41 is allowed to insert the IC card 13 into the card holder 7 from an upper and left direction, as viewed in the drawing. The connector 5 and the DC-IN jack 6 (not shown in FIG. 19(b)) are located on the right side of the reader/writer 1, as viewed from the user 41 (i.e., the back side of the drawing). This arrangement is useful for a case where it is possible to secure a space for a communication cable 42 on the right side of the desk 40, as viewed from the user 41.

Figure 19B:
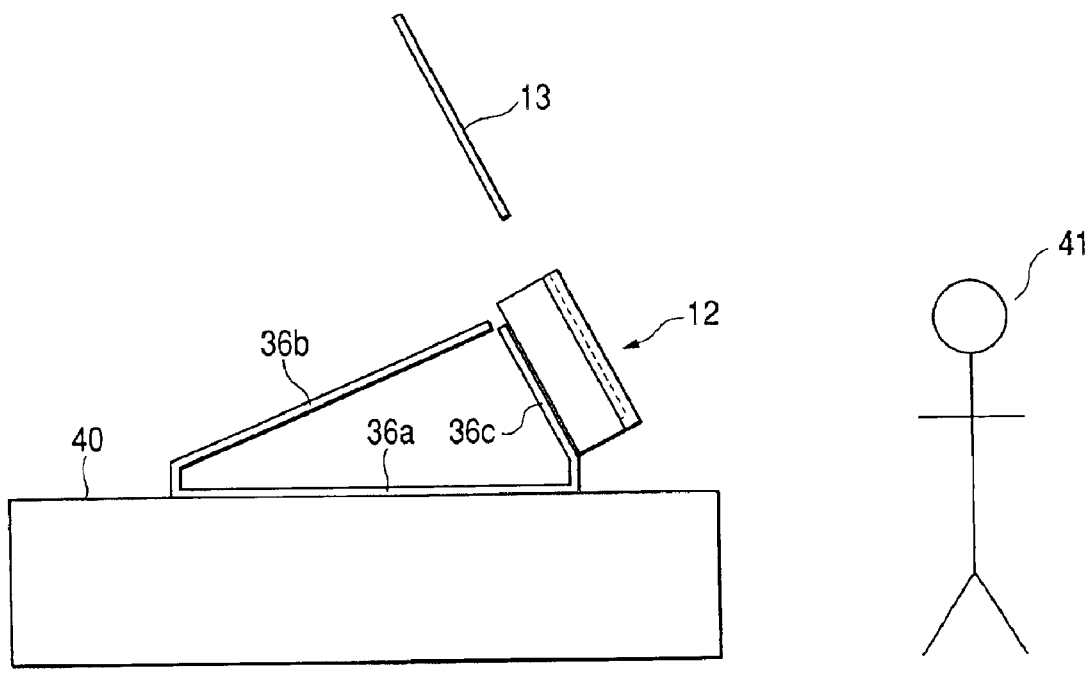
FIG. 19(b) is an illustration which shows the body of the IC card reader/writer of FIG. 18 which is placed on the other mount table at a second orientation different from that in FIG. 19(a)
Figure 20A:
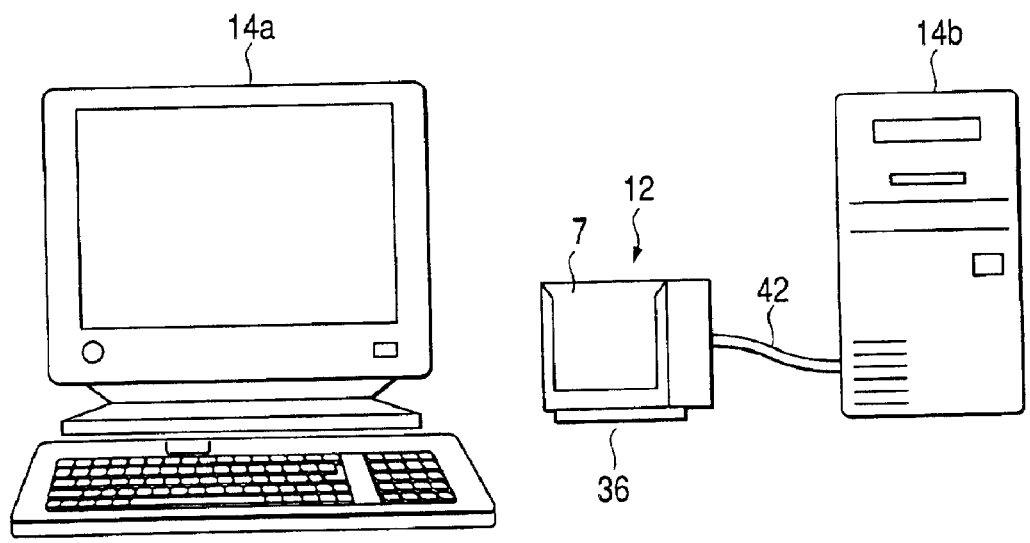
FIG. 20(a) is an illustration which shows an arrangement of FIG. 19(b), as viewed from a user.
Figure 20B:
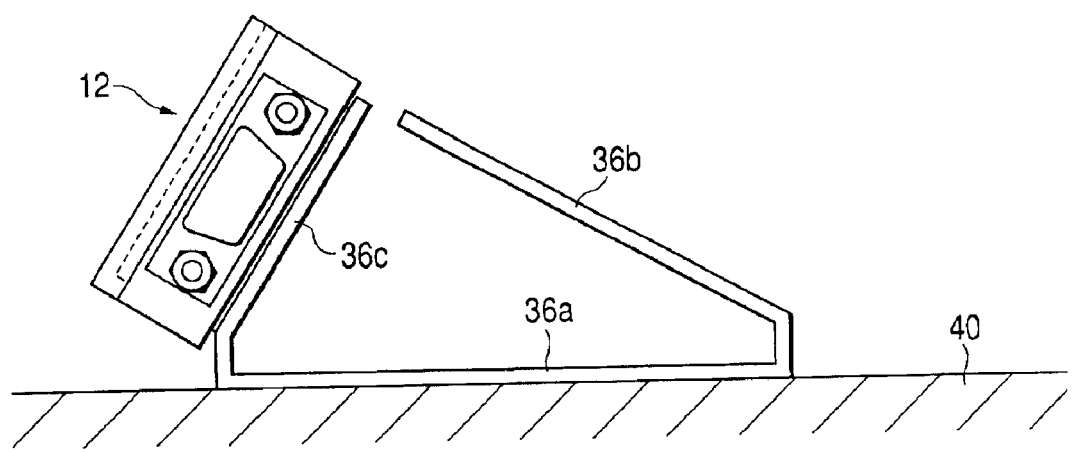
FIG. 20(b) is an illustration which shows the IC card reader/writer of FIG. 19(b) as viewed from a back side of the drawing.

FIG. 20(a) illustrates the arrangement of FIG. 19(b), as viewed from the user 41. A computer monitor 14a is disposed on the left side of the IC card reader/writer 12. A computer body 14b is placed on the right side of the IC card reader/writer 12. FIG. 20(b) illustrates the IC card reader/writer 12 as viewed from the back side of the drawing of FIG. 19(b).

The structure of this embodiment has the two mount tables 36b and 36c inclined to the base 36a at different angles, thus permitting the user to select a desired one of the mount tables 36b and 36c on which the reader/writer unit 1 is to be mounted as needed. The stay 36 is made of a one-piece member and thus easy to manufacture.

Figure 21:
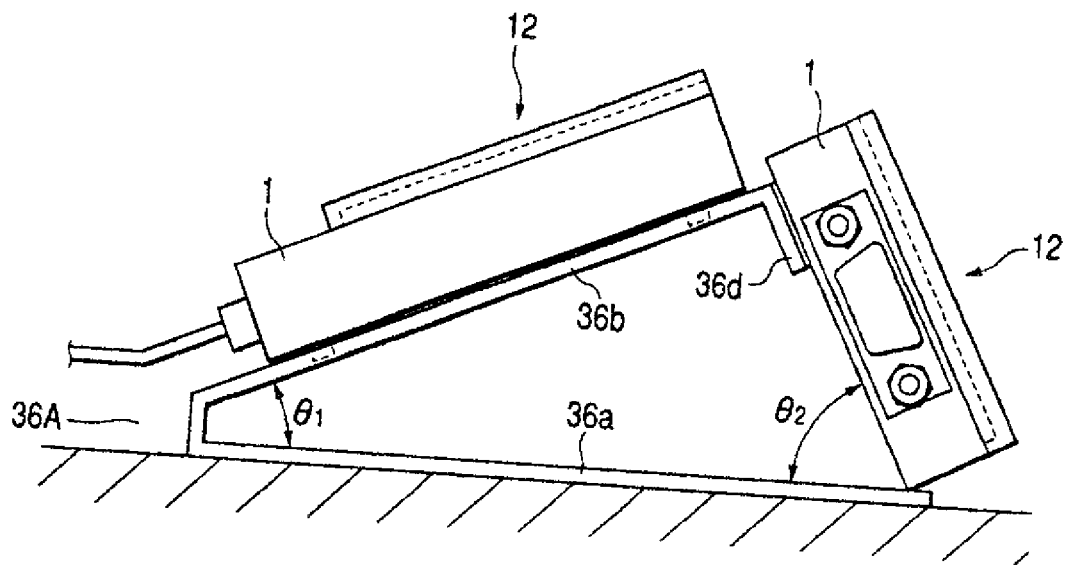
FIG. 21 is a side view which shows an IC card reader/writer which includes a stay configured to support a body of the IC card reader/writer in two different positions according to the ninth embodiment of the invention.

FIG. 21 shows the IC card reader/writer 12 according to the ninth embodiment of the invention which is different from the eighth embodiment in that the reader/writer unit 1 is mounted on a stay 36A which is different in geometrical shape from the stay 36.

The stay 36A has the mount table 36b whose end is bent downward at right angles toward the right end, as viewed in the drawing, of the base 36a to form a support 36d.

When the user would like to hold the reader/writer unit 1 at a smaller inclination, the user may mount the reader/writer unit 1 on the mount table 36b in the same manner as in the eight embodiment. Alternatively, when the user would like to hold the reader/writer unit 1 at a greater inclination, the user may mount the reader/writer unit 1 on the right side of the stay 36A, as viewed in the drawing, by standing it at a corner thereof on the base 36a with the bottom against the support 36d. Like the eighth embodiment, the angle θ1 is less than 45°, while the angle θ2 is more than 45°.

Figure 22:
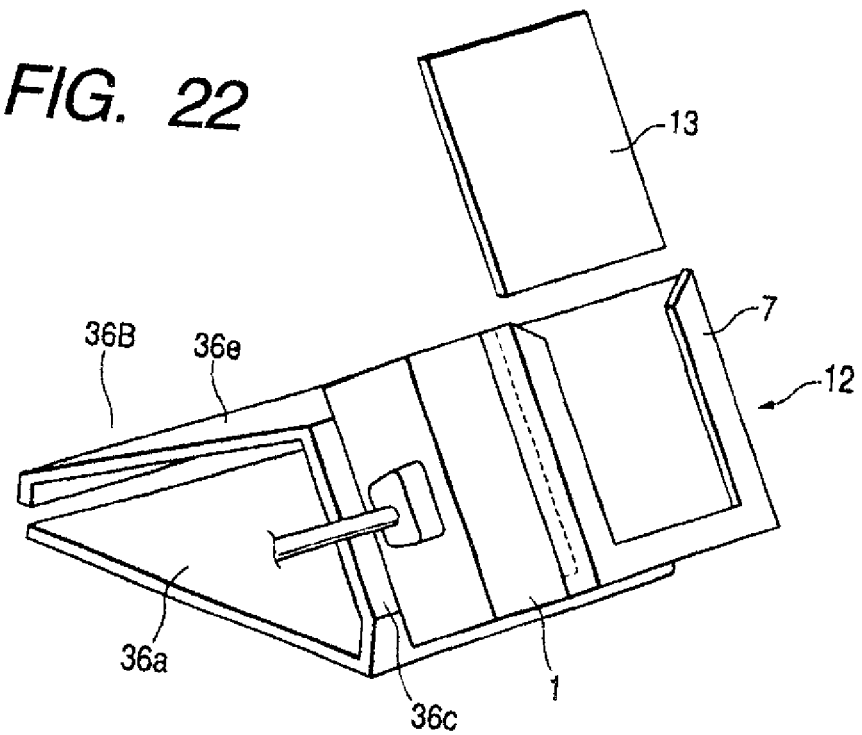
FIG. 22 is a perspective view which shows an IC card reader/writer which includes a stay configured to support a body of the IC card reader/writer in two different positions according to the tenth embodiment of the invention.

FIG. 22 shows the IC card reader/writer 12 according to the tenth embodiment of the invention.

The reader/writer unit 1 is held on a stay 36B. The stay 36B is made of a one-piece member and consists of the base 36 and mount tables 36c and 36e. The mount table 36c, like the eighth embodiment of FIG. 18, extends from an end of the base 36a. The mount table 36e continues from the mount table 36c and is oriented downward, like the eighth embodiment, but it has an end which extends perpendicular to the base 36a and is spaced at a given interval away from an end of the base 36a. The angles which the mount tables 36c and 36e make with the base 36a are equivalent to those in the eighth embodiment.

FIG. 22 illustrates, as an example, the reader/writer unit 1 held on the mount table 36c of the stay 36B.

Other arrangements are identical with those in the eighth embodiment, and explanation thereof in detail will be omitted here.

Figure 23:
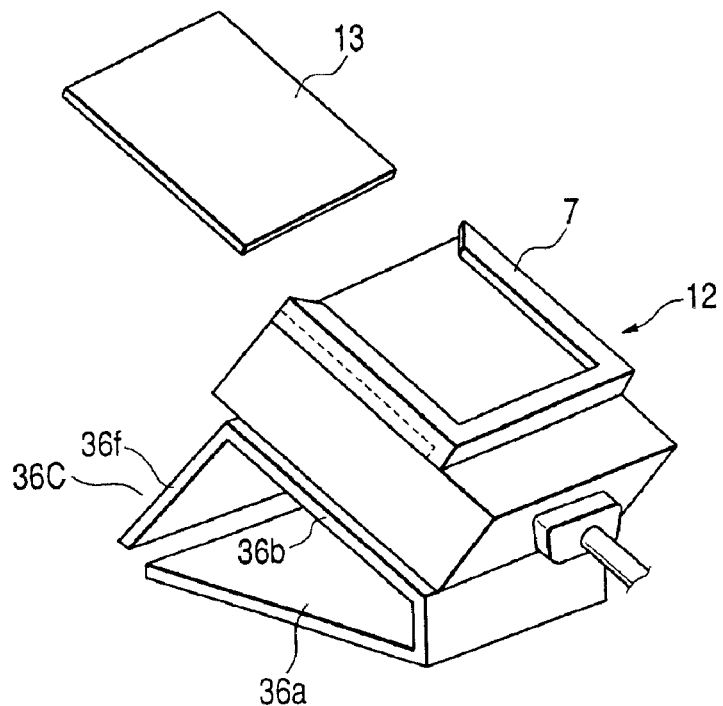
FIG. 23 is a perspective view which shows an IC card reader/writer which includes a stay configured to support a body of the IC card reader/writer in two different positions according to the eleventh embodiment of the invention.

FIG. 23 shows the IC card reader/writer 12 according to the eleventh embodiment of the invention which is a modification of the tenth embodiment of FIG. 22.

The IC card reader/writer 12 has a stay 36C. The stay 36C has mount tables 36b and 36f. The mount table 36b extends, like the mount table 36c of FIG. 22, directly from the base 36a, while the mount table 36f continues from the mount table 36b downward, like the mount table 36e of FIG. 22 and is bent perpendicular to the base 36a with an end spaced at a given interval away from the base 36a. The angles which the mount tables 36b and 36f make with the base 36a may be set equal to the angles θ1 and θ2 in FIG. 18. FIG. 23 illustrates, as an example, the reader/writer unit 1 held on the mount table 36b of the stay 36C.

Figure 24:
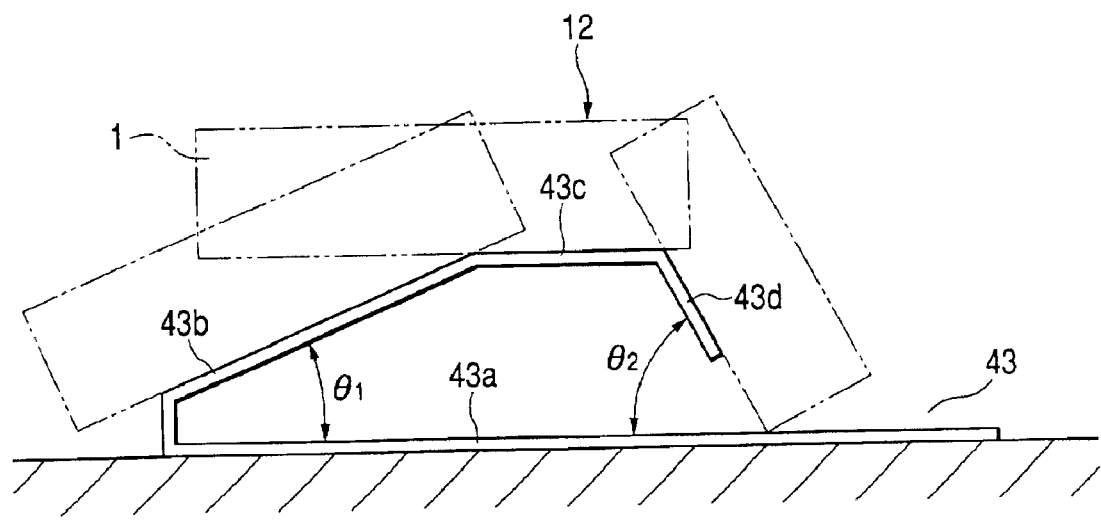
FIG. 24 is a side view which shows an IC card reader/writer which includes a stay configured to support a body of the IC card reader/writer in three different positions according to the twelfth embodiment of the invention.

FIG. 24 shows the twelfth embodiment of the invention.

The IC card reader/writer 12 has a stay 43. The stay 43 is formed by a one-piece member made of synthetic resin, for example, and consists of a rectangular base 43a and three mount tables 43b, 43c, and 43d. The mount table 43b, like the mount table 36b of FIG. 21, extends vertically from the base 43a and is bent at the angle θ1. The mount table 43c continues from the mount table 43b and extends substantially parallel to the base 43a. The mount table 43d is bent from an end of the mount table 43c downward and extends to the base 43a at the angle θ2. The mount table 43d has an end spaced at a given interval away from the base 43a.

The user may select one of the three mount tables 43b, 43c, and 43d which meets a desired angle of insertion of the IC card.

Figure 25A:
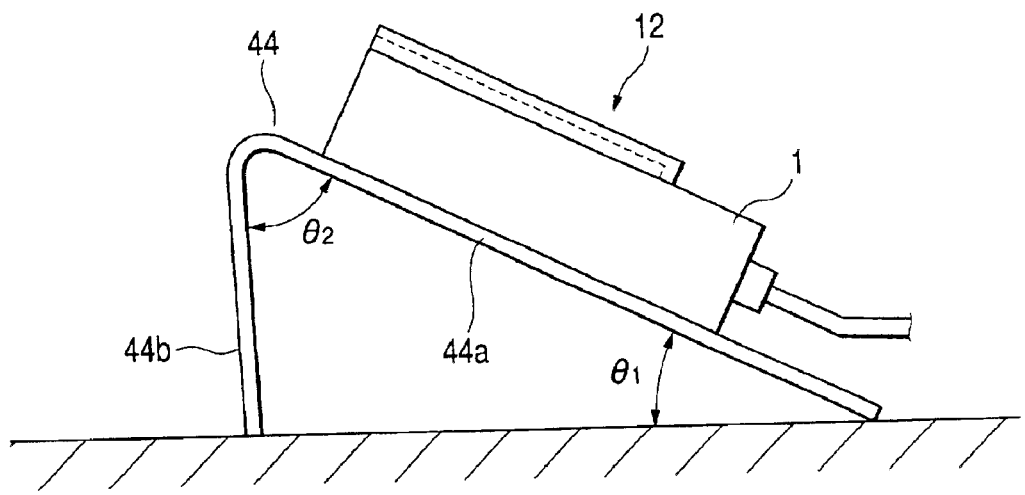
FIG. 25(a) is a side view which shows an IC card reader/writer which includes a stay configured to support a body of the IC card reader/writer in two different positions according to the thirteenth embodiment of the invention.
Figure 25B:
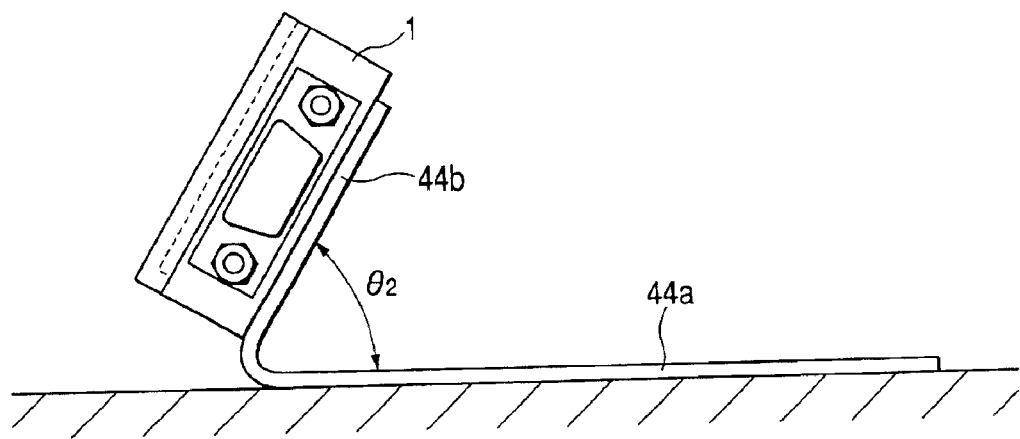
FIG. 25(b) is a side view which shows a body of the IC card reader/writer of FIG. 25(a) placed on a mount table of the stay different from the one of FIG. 25(a)

FIGS. 25(a) and 25(b) show the thirteenth embodiment of the invention.

The IC card reader/writer 12 has a stay 44. The stay 44 is formed by a one-piece strip which is bent at the angle θ2 to define two mount tables 44a and 44b. The mount table 44a is longer than the mount table 44b. When the user would like to hold the reader/writer unit 1 at a smaller inclination, the user may place the stay 44 on a desk in a position, as illustrated in FIG. 25(a), where the mount table 44a makes the angle θ1 with the plane of the desk. Alternatively, when the user would like to hold the reader/writer unit 1 at a greater inclination, the user may place the stay 44 in a position, as illustrated in FIG. 25(b), where the mount table 44a is laid directly on the plane of the desk to incline the mount table 44b at the angle θ2 to the desk.

Figure 26A:
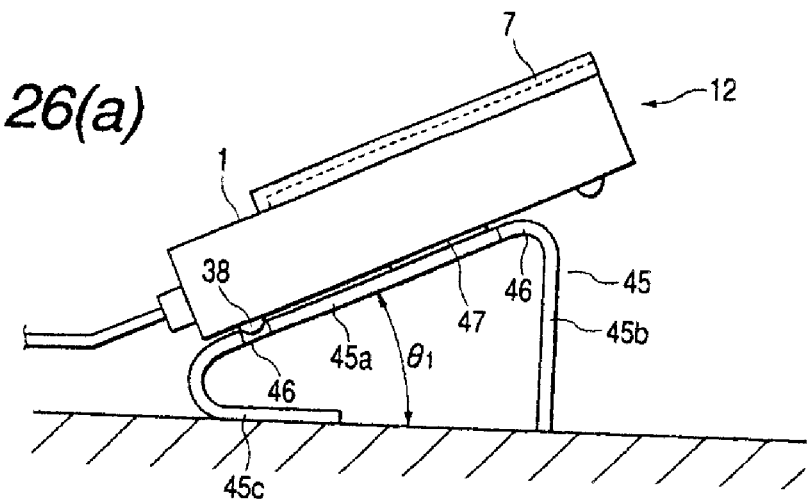
FIG. 26(a) is a side view which shows an IC card reader/writer which includes a stay configured to support a body of the IC card reader/writer in two different positions according to the fourteenth embodiment of the invention.
Figure 26B:
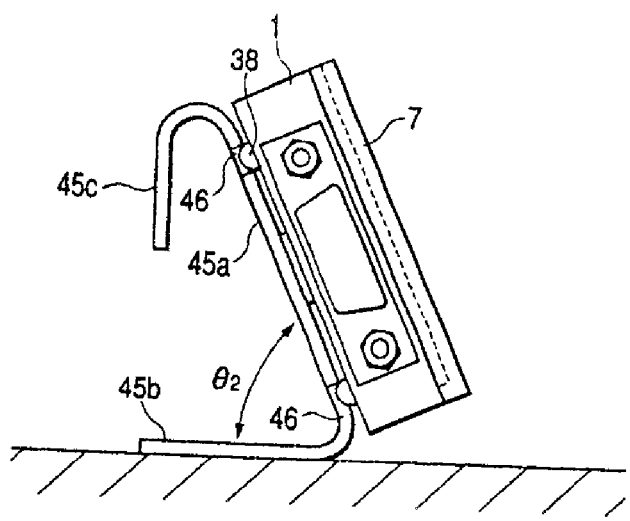
FIG. 26(b) is a side view which shows the stay of FIG. 26(a) standing in a position different from the one of FIG. 26(a)
Figure 26C:
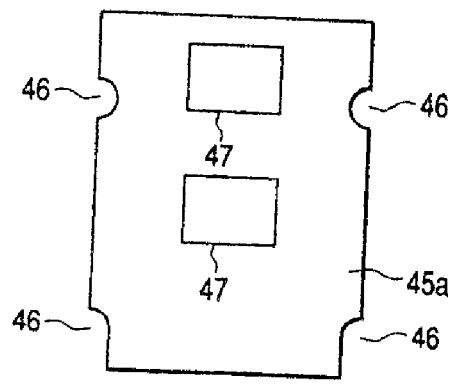
FIG. 26(c) is a plan view which shows a mount table of the stay of FIGS. 26(a) and 26(b)

FIGS. 26(a) to 26(c) show the fourteenth embodiment of the invention.

The IC card reader/writer 12 has a stay 45. The stay 45 is made of a one-piece strip which is curled in the illustrated manner to define a single mount table 45a and two bases 45b and 44c. The mount table 45a, as clearly shown in FIG. 26(a), extends from the base 45c at the angle θ1 and from the base 45b, as shown in FIG. 26(b), at the angle θ2. The mount table 45a is longer than the bases 45b and 45c.

When the user would like to hold the reader/writer unit 1 at a smaller inclination, the user may place the stay 45 on a desk in a position, as illustrated in FIG. 26(a), where the mount table 45a makes the angle θ1 with the plane of the desk. Alternatively, when the user would like to hold the reader/writer unit 1 at a greater inclination, the user may place the stay 45 in a position, as illustrated in FIG. 26(b), where the base 45b is laid directly on the plane of the desk to incline the mount table 45a at the angle θ2 to the desk.

The mount table 45a, as clearly shown in FIG. 26(c), has four arc-shaped recesses 46 formed on sides thereof in which legs 38 formed on the bottom of the reader/writer unit 1 are fitted. Two pieces of pressure sensitive adhesive double coated tape 47 are, as shown in FIG. 26(c), attached to the surface of the mount table 45a for holding the reader/writer unit 1 on the mount table 45a firmly at the two inclinations, as shown in FIGS. 26(a) and 26(b).

The structure of this embodiment is, as described above, designed to hold the reader/writer unit 1 at a desired one of the two inclinations and results in a decrease in area on the desk occupied by the IC card reader/writer 12.

Figure 27A:
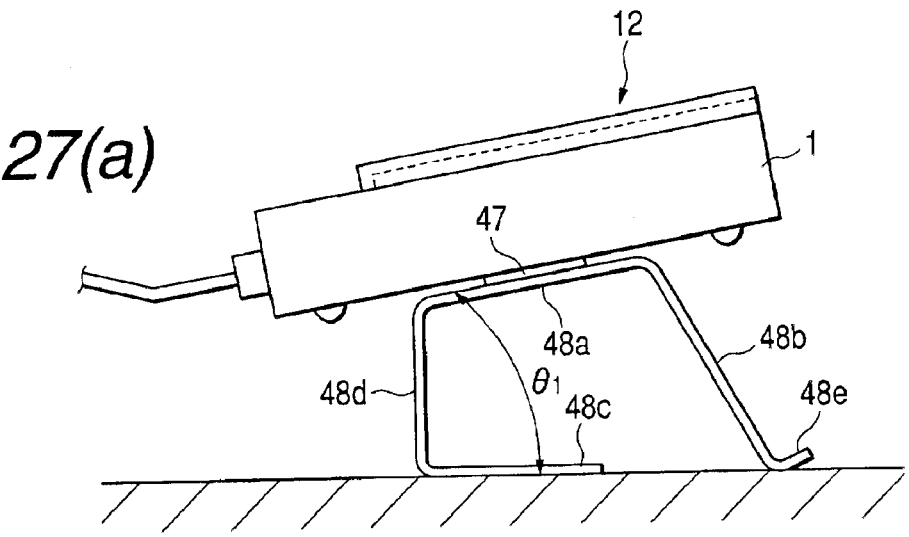
FIG. 27(a) is a side view which shows an IC card reader/writer which includes a stay configured to support a body of the IC card reader/writer in three different positions according to the fifteenth embodiment of the invention.
Figure 27B:
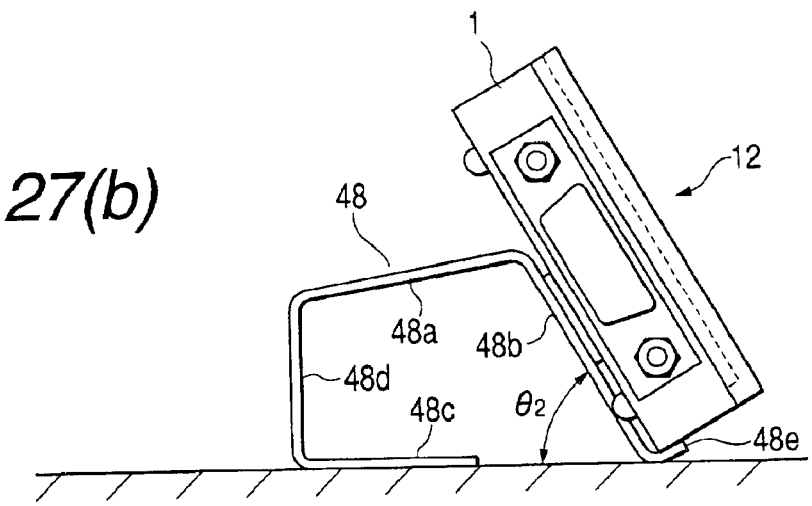
FIG. 27(b) is a side view which shows the IC card reader/writer of FIG. 27(a) mounted on the stay at a second orientation different from the one of FIG. 27(a)
Figure 27C:
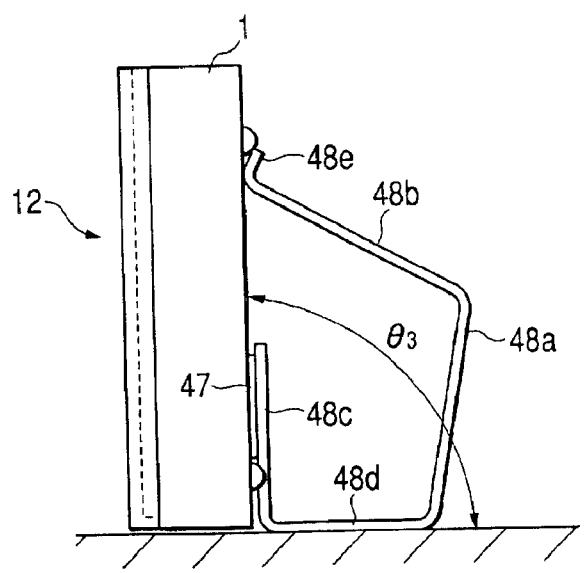
FIG. 27(c) is a side view which shows the IC card reader/writer of FIG. 27(a) mounted on the stay at a third orientation different from the ones of FIGS. 27(a) and 27(b).

FIGS. 27(a) to 27(c) show the fifteenth embodiment of the invention.

The IC card reader/writer 12 has a stay 48. The stay 48 is made of a one-piece strip which is curled to a C-shape to define three mount tables 48a, 48b, and 48c and a base 48d. The mount table 48c, as will be described later, also works as a base. The structure of this embodiment is designed to allow the user to select a desired one of three inclinations at which the reader/writer unit 1 is to be held.

FIG. 27(a) illustrates the stay 48 which is placed with the mount table 48c laid directly on the plane of a desk. The base 48d extends from an end of the mount table 48c at an angle θ3 (=90°) to incline the mount table 48a at the angle θ1 to the desk. The mount table 48b extends from an end of the mount table 48a downward at an obtuse angle and has an end bent upward at right angles to define a support 48e. The mouth table 48b is inclined at the angle θ2 to the plane of the dick. The reader/writer unit 1 is held on the mount table 48a firmly using the pressure sensitive adhesive double coated tape 47.

FIG. 27(b) illustrates an example where the reader/writer unit 1 is held on the mount table 48b of the stay 48 placed on the desk in the same position as shown in FIG. 27(a). The reader/writer unit 1 also has a side edge put on the support 48e.

FIG. 27(c) illustrates an example where the reader/writer unit 1 is held by the stay 48 at right angles to the desk. The stay 48 is placed on the dick with the base 48d laid directly on the plane of the desk. The reader/writer unit 1 is attached to the mount table 48c through the pressure sensitive adhesive double coated tape 47. An area of the base 48c is smaller than areas on the desk occupied by the stay 48, as shown in FIGS. 27(a) and 27(b).

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For example, the data reading table 3 is not limited in external form to square or octagonal shape, but may be of polygonal shape such as pentagon or hexagon. The data reading table 3 may also be formed to have a rectangular shape to limit the insertion of the IC card to the card holder to one direction.

The installation of the card holder 7, for example, in the first embodiment may be achieved by fitting only the guide groove 10u on the edge 3a of the data reading table 3. Additionally, if it is possible to ensure frictional adhesion sufficient for holding the card holder on the data reading table firmly, the direction of installation of the card holder on the data reading table may be the same as that of insertion of the IC card into the card holder.

The connector 5 and the DC-IN jack 6 may be provided in a single unit. For instance, one of pins of the connector 5 may be used for power supply.

The stay in each of the above embodiments may be made of several discrete parts joined or welded to each other or a one-piece member closed in a polygonal shape.

What is claimed is:

1. An IC card reader configured to read data from an IC card through a radio communication, the IC card reader comprising:
   a casing made from a material through which the radio communication can occur;
   a data reading table provided on a surface of said casing, constructed to allow the IC card to be brought into proximity thereto, said data reading table having substantially flat surface over which the IC card is to be placed;
   an antenna disposed within said data reading table, said antenna working to establish the radio communication with the IC card which is placed over said data reading table;
   a card holder designed to hold the IC card in proximity to the data reading table, said card holder serving as a portion of an IC card access guide which guides access of the IC card to said data reading table;
   at least a first and a second recess formed in said data reading table, said first and said second recesses each having a first physical geometry facilitating installation of said card holder on said data reading table;
   a protrusion formed on said card holder, said protrusion having a second physical geometry for selectively establishing engagement with one of said first and said second recesses; and
   a fastening mechanism which includes said first and said second recesses and said protrusion to attach said card holder to the data reading table detachably, said fastening mechanism being designed to allow one of a first and a second joint mode to be achieved selectively, the first joint mode establishing a joint between said card holder and said data reading table in engagement of the first recess with said protrusion, the second joint mode establishing a joint between said card holder and said data reading table in engagement of the second recess with said protrusion, the first and second joint modes being different in orientation in which the access of the IC card to said data reading table is guided.

2. An IC card reader as set forth in claim 1, wherein said fastening mechanism includes a polygonal table used as the data reading table, said polygonal table being configured to have one of corners and sides establishing a firm engagement with said card holder.

3. An IC card reader as set forth in claim 2, wherein said polygonal table is designed to establish the firm engagement with said card holder at one of: at least two of the corners and at least two the sides.

4. An IC card reader as set forth in claim 3, wherein said polygonal table is of a square shape.

5. An IC card reader as set forth in claim 1, wherein said fastening mechanism is so configured that said card holder is fitted on the data reading table from a preselected direction, wherein said card holder includes a card holding portion into which the IC card is capable of being inserted and from which the IC card is capable of being drawn, and wherein a direction in which the IC card is drawn from the card holding portion is different from the preselected direction in which said card holder is fitted on the data reading table.

6. An IC card reader as set forth in claim 5, wherein the direction in which the IC card is drawn from the card holding portion is perpendicular to the preselected direction in which said card holder is fitted on the data reading table.

7. An IC card reader as set forth in claim 1, wherein said card holder is so configured that the IC card is inserted and held and has provided thereon an indication of a direction in which the IC card is to be inserted into said card holder.

8. An IC card reader as set forth in claim 1, wherein said fastening mechanism includes a portion of said card holder which is configured to establish firm engagement of said card holder with the data reading table.

9. An IC card reader as set forth in claim 1, wherein said casing has a plurality of surfaces oriented in different directions, one of the surfaces having installed thereon a communication port to which a communication cable is connected to establish communication with a host device and a power supply port to which a power supply cable is connected.

10. An IC card reader as set forth in claim 9, wherein the communication port and the power supply port are made of a single unit.

11. An IC card reader as set forth in claim 1, further comprising a stay to support a body of the IC card reader on a plane at a given angle to the plane, said stay having a substantially flat surface, said card holder and said protrusion formed integrally, the substantially flat surface of the stay being placed in contact with said body of the IC card on the plane, said stay being configured to be detachably attached to said data reading table.

12. An IC card reader configured to read data from an IC card through a radio communication, the IC card reader comprising:
a casing made of a material through which the radio communication can occur;
a data reading table provided on a surface of said casing, constructed to allow the IC card to be brought into proximity thereto, said data reading table having substantially flat surface over which the IC card is to be placed;
an antenna disposed within said data reading table, said antenna working to establish the radio communication with the IC card which is placed over said data reading table;
a card holder designed to hold the IC card in proximity to the data reading table, said card holder serving as a portion of an IC card access guide which guides access of the IC card to said data reading table; and
a fastening mechanism including a polygonal table used as said data reading table which establishes engagement with said card holder at one of: at least two of corners of the polygonal table, and at least two sides of the polygonal table.

13. An IC card reader as set forth in claim 12, wherein said polygonal table is of a square shape.

14. An IC card reader as set forth in claim 12, wherein said fastening mechanism is configured such that said card holder is fitted on the data reading table from a preselected direction, wherein said card holder includes a card holding portion into which the IC card is capable of being inserted and from which the IC card is capable of being drawn, and wherein a direction in which the IC card is drawn from the card holding portion is different from the preselected direction in which said card holder is fitted on the data reading table.

15. An IC card reader as set forth in claim 14, wherein the direction in which the IC card is drawn from the card holding portion is perpendicular to the preselected direction in which said card holder is fitted on the data reading table.

16. An IC card reader as set forth in claim 12, wherein said card holder is configured such that the IC card is inserted and held and has provided thereon an indication of a direction in which the IC card is to be inserted into paid card holder.

17. An IC card reader as set forth in claim 12, wherein said fastening mechanism includes a portion of said card holder which is configured to establish firm engagement of said card holder with the data reading table.

18. An IC card reader as set forth in claim 12, wherein said casing has a plurality of surfaces oriented in different directions, one of the surfaces having installed thereon a communication port to which a communication cable is connected to establish communication with a host device and a power supply port to which a power supply cable is connected.

19. An IC card reader as set forth in claim 18, wherein the communication port and the power supply port are included in a single unit.

20. An IC card reader as set forth in claim 12, further comprising a stay to support a body of the IC card reader on a plane at a given angle to the plane, said stay having a substantially flat surface, said card holder and said protrusion formed integrally, the substantially flat surface of the stay being placed in contact with said body of the IC card on the plane, said stay being configured to be detachably attached to said data reading table.

* * * * *

UNITED STATES PATENT AND TRADEMARK OFFICE
CERTIFICATE OF CORRECTION

PATENT NO. : 6,840,447 B2  Page 1 of 1
APPLICATION NO. : 10/184046
DATED : January 5, 2005
INVENTOR(S) : Hirata et al.

It is certified that error appears in the above-identified patent and that said Letters Patent is hereby corrected as shown below:

On the title page item [73], insert Denso Corporation Kariya, Japan

Signed and Sealed this

Fifth Day of February, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,840,447 B2 | Page 1 of 1 |
| APPLICATION NO. | : 10/184046 | |
| DATED | : January 11, 2005 | |
| INVENTOR(S) | : Hirata et al. | |

It is certified that error appears in the above-identified patent and that said Letters Patent is hereby corrected as shown below:

On the title page item [73], insert Denso Corporation Kariya, Japan

This certificate supersedes the Certificate of Correction issued February 5, 2008.

Signed and Sealed this

Twenty-sixth Day of February, 2008

JON W. DUDAS
*Director of the United States Patent and Trademark Office*